United States Patent [19]

Masuoka et al.

[11] Patent Number: 5,297,237
[45] Date of Patent: Mar. 22, 1994

[54] LEARNING SYSTEM FOR A DATA PROCESSING APPARATUS

[75] Inventors: Ryusuke Masuoka, Tokyo; Nobuo Watanabe, Zama; Takashi Kimoto, Yokohama; Akira Kawamura; Kazuo Asakawa, both of Kawasaki; Jun'ichi Tanahashi, Yamato, all of Japan

[73] Assignee: Fujitsu Limited, Kawasaki, Japan

[21] Appl. No.: 913,749

[22] Filed: Jul. 17, 1992

Related U.S. Application Data

[63] Continuation of Ser. No. 481,195, Feb. 20, 1990, abandoned.

[30] Foreign Application Priority Data

Feb. 20, 1989 [JP] Japan .................. 1-039670
Feb. 21, 1989 [JP] Japan .................. 1-041448

[51] Int. Cl.$^5$ .............................................. G06F 15/18
[52] U.S. Cl. ........................................ 395/23; 395/24
[58] Field of Search ............................ 395/23, 24, 22

[56] References Cited

PUBLICATIONS

IEEE First International Conference on Neural Networks, vol. 2, Jun. 21, 1987, San Diego, Calif., "Exploration of Backward Error Propagation as a Self-Organizational Structure", Robert M. Kuczewski et al., pp. 89–96.

IEEE First International Conference on Neural Networks, vol. 2, Jun. 21, 1987, San Diego, Calif., "Learning Phenomena in Layered Neural Networks", Bernard Widrow, et al., pp. 411–430.

Neural Networks, vol. 1, No. 4, 1988, Oxford, GB, "Generalization of Backpropagation with Application to a Recurrent Gas Market Model", Paul J. Werbos, pp. 339–356.

IEEE International Conference on Neural Networks, vol. 1, Jul. 24, 1988, San Diego, Calif., "Distortion Invariant Character Recognition by a Multi-layer Perceptron Recognition by a Multi-layer Perceptron and Backpropagation Learning", A. Khotanzad et al., pp. 625–632.

Primary Examiner—Allen R. MacDonald
Attorney, Agent, or Firm—Staas & Halsey

[57] ABSTRACT

A learning system is used in a data processing apparatus for learning an input pattern by obtaining an internal-state value necessary for realizing a desired data conversion by performing a pattern conversion defined by the internal-state value and calculating an output pattern corresponding to the input pattern. The learning system comprises a pattern presenting unit for presenting an input pattern group of the subject to be learned for pattern conversion, dividing the input pattern group of the subject to be learned into at least two sets, selecting one of the divided sets, presenting the input pattern group of the selected set to a pattern conversion unit and presenting an input pattern group belonging to all the sets presented up to the current point when the internal-state value to be converged is obtained in accordance with the presentation of the selected set, and an error value calculating unit for calculating an error value representing a magnitude of a non-consistency between an output pattern group outputted in accordance with the presentation and a teacher pattern group representing a pattern to be obtained by the output pattern group.

8 Claims, 26 Drawing Sheets

```
input :U            input :V            input :W            input :X            input :Y
01000010            010000010           01000010            01000010            001000010
01000010            010000010           01000010            01000010            001000010
01000010            010000010           01001010            00111100            000111100
01000010            001000100           01010010            00100100            000011000
01000010            000101000           01100010            00100100            000011000
00111100            000010000           01000010            01000010            000010000
00000000            000000000           00000000            00000000            000000000
output:U            output:V            output:W            output:X            output:Y
000001000000        000000000010000     000000000001000     00000000000100      000000000000010
000000000000        000000000000000     000000000000000     00000000000000      000000000000000 input :Z
01111110
00000010
00000100
00001000
00110000
01000000
01111110
00000000
output:Z
000000000000001
000000000000000
```

Fig. 10C

ADDING LEARNING : DIFFERENCE DEPENDING ON THE NUMBER OF DIVISIONS

| seed | NUMBER OF PRESENTATIONS |  |  |  | TOTAL AMOUNT OF CALCULATION |  |  |  |
|---|---|---|---|---|---|---|---|---|
|  | 1 DIVISION | 2 DIVISION | 3 DIVISION | 4 DIVISION | 1 DIVISION | 2 DIVISION | 3 DIVISION | 4 DIVISION |
| 100000 | 10478 | 6084 | 5561 | 6247 | 76218270 | 46357376 | 43243911 | 49169541 |
| 110000 | 6942 | 5148 | 4731 | 4814 | 51822030 | 39397956 | 36913997 | 37999898 |
| 120000 | 7098 | 5317 | 4835 | 5804 | 52986570 | 40567735 | 37684793 | 45389820 |
| 130000 | 12090 | 4680 | 5320 | 5423 | 90251850 | 35787492 | 41301680 | 42421321 |
| 140000 | 6786 | 4953 | 4669 | 5238 | 50657490 | 37856039 | 36353155 | 41018682 |
| 150000 | 6318 | 4966 | 4943 | 5294 | 47163870 | 37950302 | 38501285 | 41391354 |
| 160000 | 12350 | 5291 | 5813 | 5828 | 92192750 | 40445977 | 45260339 | 45697380 |
| 170000 | 8450 | 5928 | 5741 | 5589 | 63079250 | 45226220 | 44771651 | 44070107 |
| 180000 | 11856 | 5187 | 5723 | 6235 | 88505040 | 39675181 | 44396317 | 48921173 |
| 190000 | 9750 | 5330 | 5561 | 6489 | 72783750 | 40801098 | 43405267 | 51068947 |
| AVERAGE | 9211 | 5288 | 5289 | 5696 | 68766087 | 40406537 | 41183239 | 44714622 |
| DISPERSION | 2268 | 407 | 428 | 498 | 16936852 | 3070030 | 3316764 | 3934548 |

Fig. 11A

AMOUNT OF CALCULATION OF SUPPLEMENTARY LEARNING PATTERN PRESENTING SYSTEM AND NORMAL SYSTEM

| seed | NUMBER OF PRESENTATIONS | | | | TOTAL AMOUNT OF CALCULATION | | | |
|---|---|---|---|---|---|---|---|---|
| | (1) | (2) | (3) | (4) | (1) | (2) | (3) | (4) |
| 100000 | 10478 | 5116 | 6247 | 3328 | 78218270 | 48661810 | 49169541 | 35603768 |
| 110000 | 6942 | 4657 | 4814 | 3149 | 51822030 | 41389360 | 37999898 | 33650486 |
| 120000 | 7098 | 5106 | 5804 | 3121 | 52986570 | 44167800 | 45389820 | 34668079 |
| 130000 | 12090 | 4539 | 5423 | 3146 | 90251850 | 45354720 | 42421321 | 31665213 |
| 140000 | 6786 | 4627 | 5238 | 3054 | 50657490 | 40420480 | 41018682 | 32160885 |
| 150000 | 6318 | 4450 | 5294 | 3064 | 47163870 | 39187060 | 41391354 | 33192045 |
| 160000 | 12350 | 5793 | 5828 | 3109 | 92192750 | 57737400 | 45697380 | 34348394 |
| 170000 | 8450 | 4680 | 5589 | 3489 | 63079250 | 44511480 | 44070107 | 36330467 |
| 180000 | 11856 | 5116 | 6235 | 3491 | 88505040 | 55299220 | 48921173 | 36815925 |
| 190000 | 9750 | 5533 | 6489 | 3634 | 72783750 | 51117670 | 51068947 | 39865514 |
| AVERAGE | 9211 | 4961 | 5696 | 3258 | 68766087 | 46784700 | 44714822 | 34830077 |
| DISPERSION | 2268 | 425 | 498 | 199 | 16936852 | 5967868 | 3934548 | 2315659 |

Fig. 14A

DIFFERENCE CAUSING FROM THE WAY ξ IS OBTAINED

| seed | (5) INVERSE PROPORTION | | (6) FIXATION | |
|---|---|---|---|---|
| | NUMBER OF PRESENTATION | TOTAL AMOUNT OF CALCULATION | NUMBER OF PRESENTATION | TOTAL AMOUNT OF CALCULATION |
| 100000 | 1315 | 14864443 | 3328 | 35603768 |
| 110000 | 1444 | 22613270 | 3149 | 33650486 |
| 120000 | 1246 | 15733357 | 3121 | 34668079 |
| 130000 | 1298 | 15862729 | 3146 | 31665213 |
| 140000 | 1233 | 15567708 | 3054 | 32160885 |
| 150000 | 1307 | 18042291 | 3064 | 33192045 |
| 160000 | 1417 | 18332421 | 3109 | 34348394 |
| 170000 | 1428 | 18323204 | 3489 | 36330467 |
| 180000 | 1439 | 17112390 | 3491 | 36815925 |
| 190000 | 1503 | 18156312 | 3634 | 39865514 |
| AVERAGE | 1363 | 17460812 | 3258 | 34830077 |
| MAXIMUM | 1503 | 22613270 | 3634 | 39865514 |
| MINIMUM | 1233 | 14864443 | 3054 | 31665213 |
| DISPERSION | 89 | 2117957 | 199 | 2315659 |

Fig. 15A

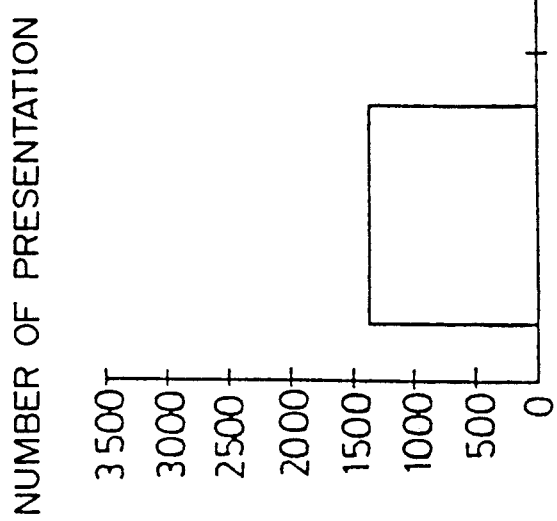
Fig. 15B(1)
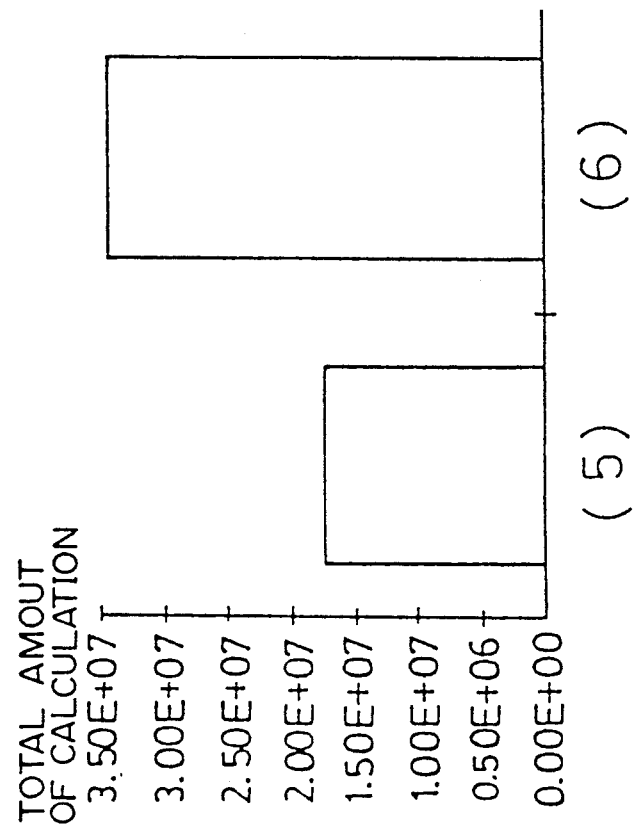
Fig. 15B(2)

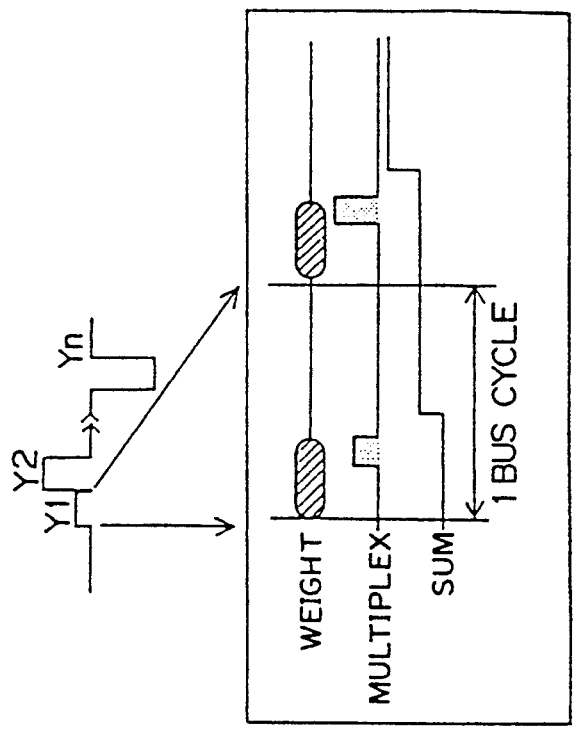
Fig. 19B
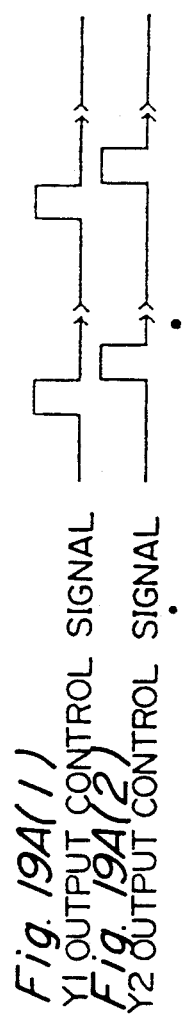
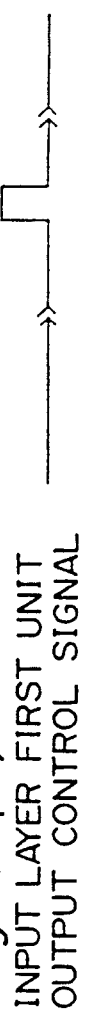
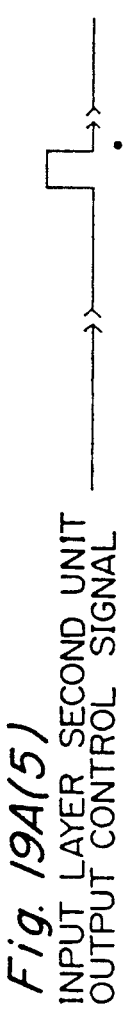
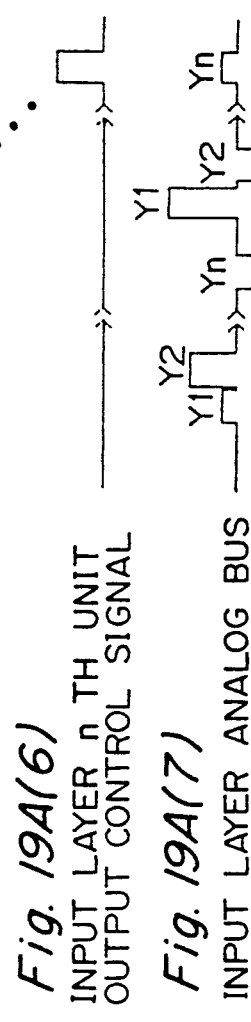
Fig. 19A(1) Y1 OUTPUT CONTROL SIGNAL
Fig. 19A(2) Y2 OUTPUT CONTROL SIGNAL
Fig. 19A(3) Yn OUTPUT CONTROL SIGNAL
Fig. 19A(4) INPUT LAYER FIRST UNIT OUTPUT CONTROL SIGNAL
Fig. 19A(5) INPUT LAYER SECOND UNIT OUTPUT CONTROL SIGNAL
Fig. 19A(6) INPUT LAYER nTH UNIT OUTPUT CONTROL SIGNAL
Fig. 19A(7) INPUT LAYER ANALOG BUS
Fig. 19A(8) INTERMEDIATE LAYER ANALOG BUS

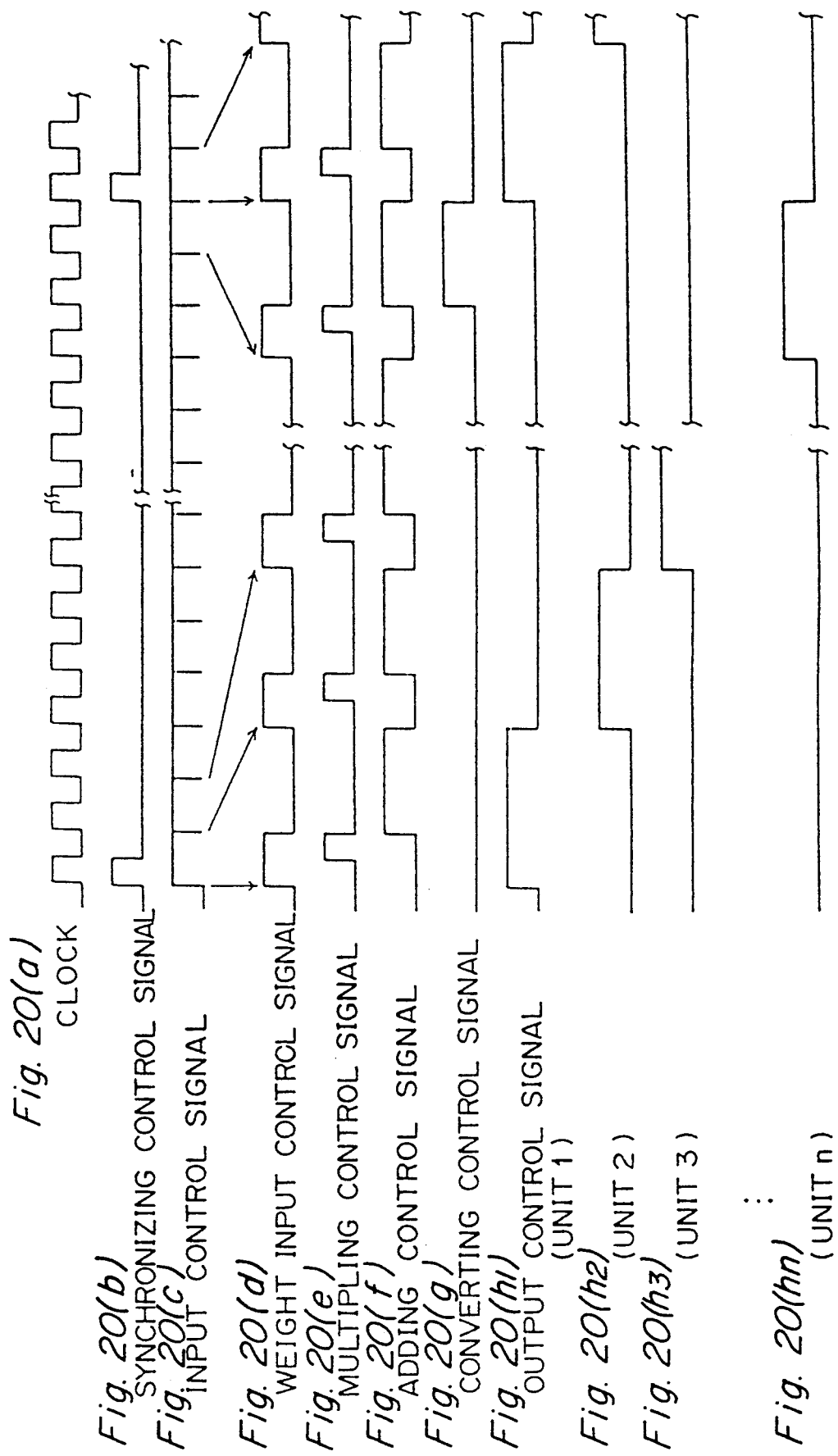

LEARNING SYSTEM FOR A DATA PROCESSING APPARATUS

This application is a continuation of application No. 07/481,195, filed Feb. 20, 1990, now abandoned.

BACKGROUND OF THE INVENTION

The present invention relates to a learning system for a data processing apparatus for determining an internal state value which defines a pattern conversion in order to realize a data processing function by a learning process and more particularly to a learning system for a data processing apparatus capable of quickly learning an internal state value.

In a conventional sequential processing computer (Neuman type), the data processing function cannot be controlled in accordance with a change in the usage method and environment. Therefore, an adaptive data processing apparatus, represented by a parallel distribution process system with a network structure mainly in the field of pattern recognition and adaptive filter technology, is required. Such an adaptive data processing apparatus needs to obtain, by a learning process, an internal state value defining the data processing function.

Of the systems for learning the internal state values in data processing apparatuses, the process method called the back propagation method (D. E. Rumelhart, G. E. Hinton, and R. J. Wiliams, "Learning Internal Representations by Error Propagation, "PARALLEL DISTRIBUTED PROCESSING, Vol.1, pp. 318-364, The MIT Press, 1986) receives attention because of its high practicality.

In a data processing apparatus with a layered network structure, the layered network comprises a kind of node called a basic unit and an internal connection with a weight value corresponding to an inner state value.

FIG. 1 shows the structure of a basic unit 1, which comprises a system with multiple inputs and a single output. It comprises a multiplication unit 2 for multiplying the weight of an internal connection by a plurality of inputs, an accumulating unit 3 for adding all the multiplied results, and a threshold value processing unit 4 for performing a non-linear threshold value process on an accumulated value and outputting a final value, and is composed of a layered network, as shown in FIG. 2. The data processing function is conducted to convert the input signal (input pattern) to a corresponding output signal (output pattern). According to the back propagation method applied to the layered network, the output signal corresponding to the input signal provided for a learning is expected to become a teacher signal (teacher pattern) for designating the signal value. Thus, the weight value of an internal connection of a layered network is determined in accordance with a predetermined learning algorithm. When the value is determined by this process, the layered network outputs the new output signal, even if an unexpected input signal is applied thereto. Thus, a flexible data processing function is provided. However, the learning process must be realized within a shorter time period. That is, it is necessary to shorten the time period required for learning different patterns, including interference between patterns, so that interference between patterns is avoided and different patterns are separated from each other. To realize the required complex data process, the layered network structure must also be complicated. This makes it difficult to shorten the process.

A conventional back-propagation system for use in an adaptable data processing apparatus with a layered network structure is now explained in detail. Supposing that an h layer is a pre-stage layer, and an i layer is a post-stage layer. An arithmetic operation conducted in the arithmetic processing unit 3 within a basic unit 1 is expressed as shown in equation (1). An operation performed by threshold value unit 4 is described by the following equation (2).

$$x_{pi} = \sum_h y_{ph} W_{ih} \tag{1}$$

$$y_{pi} = 1/(1 + \exp(-x_{pi} + \theta_i)) \tag{2}$$

where,
- h: the unit number of an h layer,
- i: the unit number of an i layer,
- p: the pattern number of the input signal,
- $\theta_i$: the threshold value of the ith unit of the i layer
- $W_{ih}$: the weight value of an internal connection between h i layers,
- $x_{pi}$: the sum of the products of the input from respective units in h layer to the ith unit in the i layer,
- $y_{ph}$: the output from the hth unit of the h layer for the input signal of the pth pattern input signal
- $y_{pi}$: the ith unit of the i layer corresponding to the input signal of the pth pattern.

The back propagation system performs an automatic adjustment adaptively by using a feed back of the weight value $W_{ih}$ and the threshold value $\theta_i$. As is clear from equations (1) and (2), it is necessary to change the weight value Wih and the threshold value $\theta_i$, simultaneously. However, this is difficult because of mutual interference. Therefore, the present applicant proposes that a basic unit 1 with "1" as an input signal be provided at a layer of the input side and the threshold value $\theta$i be combined within the weight value Wih, thereby preventing threshold value $\theta$i from appearing in equation (2). Thus, equations (1) and (2) are expressed as follows.

$$x_{pi} = \sum_h y_{ph} W_{ih} \tag{3}$$

$$y_{pi} = 1/(1 + \exp(-x_{pi})) \tag{4}$$

A conventional process for learning the weight value is explained in accordance with equations (3) and (4). This explanation can be conducted by a layered network having a structure comprising an h layer, an i layer and a j layer, as shown in FIG. 3.

The following equation can be obtained from equations (3) and (4).

$$x_{pj} = \sum_i y_{pi} W_{ji} \tag{5}$$

$$y_{pj} = 1/(1 + \exp(-x_{pj})) \tag{6}$$

where,
- j: the unit number of j layer,
- $W_{ji}$: a weight value of the internal connection between i-j layers, $x_{pj}$: the sum of the products of the input from respective units of an i layer to the j layer unit of the j layer.

$y_{pj}$: the output from the jth unit of the j layer for an input signal of the pth pattern According to the process for learning the weight value, the error vector Ep is first based on the following equations. It is the second power sum of the errors between the teacher signal and the output signal from the output layer and is calculated as an error produced by the layered network. The teacher signal is the signal which the output signal should become.

$$E_p = \frac{1}{2} \sum_j (y_{pj} - d_{pj})^2 \qquad (7)$$

$$E = \sum_p E_p \qquad (8)$$

where,

Ep: an error vector for the input signal of the pth pattern,

E: the sum of the error vectors for the input voltage with regard to all the patterns.

$d_{pj}$: a teacher signal to the jth unit of the jth layer for the input signal of the pth pattern.

It may be necessary to perform a partial differential of $y_{pj}$ in equation (7) to obtain the relation between the error vector and the output signal.

$$\frac{\partial E_p}{\partial y_{pj}} = y_{pj} - d_{pj} = \delta_{pj} \qquad (9)$$

Further, to obtain the relation between error vector Ep and the input to the j layer, error vector Ep should be partially differentiated with respect to $x_{pj}$ in accordance with the following equation.

$$\frac{\partial E_p}{\partial x_{pj}} = \frac{\partial E_p}{\partial y_{pj}} \cdot \frac{\partial y_{pj}}{\partial x_{pj}} \qquad (10)$$
$$= \delta_p y_{pj} (1 - y_{pj})$$

Further, a relation between error vector Ep and a weight value between the i-j layers is obtained. Thus, error vector Ep is subjected to a partial differentiation with respect to $W_{ji}$.

$$\frac{\partial E_p}{\partial W_{ji}} = \frac{\partial E_p}{\partial x_{pj}} \cdot \frac{\partial x_{pj}}{\partial W_{ji}} \qquad (11)$$
$$= \delta_p y_{pj} (1 - y_{pj}) y_{pi}$$

Thus, the solution represented by the above sum of the products is obtained.

Next, a variation of error vector Ep for an output Ypi of an i layer is obtained as follows.

$$\frac{\partial E_p}{\partial y_{pi}} = \sum_j \frac{\partial E_p}{\partial x_{pj}} \cdot \frac{\partial x_{pj}}{\partial y_{pi}} \qquad (12)$$
$$= \sum_j \delta_p y_{pj} (1 - y_{pj}) W_{ji}$$

Further, a variation of an error vector for a variation of a total sum $x_{pi}$ to an i layer input unit is calculated. Thus, $$\frac{\partial E_p}{\partial x_{pi}} = \sum_j \frac{\partial E_p}{\partial y_{pj}} \cdot \frac{\partial y_{pj}}{\partial x_{pi}} \qquad (13)$$
$$= \left( \sum_j \delta_p y_{pj} (1 - y_{pj}) W_{ji} \right) y_{pi} (1 - y_{pi})$$

The solution represented by the above sum of the products can be obtained. Further, the relation between the variation of the error vector and the variation of the weight value between the h-i layers is obtained as follows.

$$\frac{\partial E_p}{\partial W_{ih}} = \sum_j \frac{\partial E_p}{\partial x_{pi}} \cdot \frac{\partial x_{pi}}{\partial W_{ih}} \qquad (14)$$
$$= \left( \sum_j \delta_p y_{pj} (1 - y_{pj}) W_{ji} \right) y_{pi} (1 - y_{pi}) y_{ph}$$

The solution represented by the above sum of the products can be thus obtained. The relation between the error vector and weight value between i-j layers for the total input patterns is obtained, and is expressed by the following equation.

$$\frac{\partial E}{\partial W_{ji}} = \sum_p \frac{\partial E_p}{\partial W_{ji}} \qquad (15)$$

The relation between the error vectors for all the input patterns and the weight value between the h-i layers can be obtained as follows.

$$\frac{\partial E}{\partial W_{ih}} = \sum_p \frac{\partial E_p}{\partial W_{ih}} \qquad (16)$$

Equations (15) and (16) represent a rate of change ratio of an error vector to a variation in a weight value between the layers. If the weight is changed so that the rate of damage is always made negative, according tot he so-called gradient method, the sum of error vectors can be gradually converged to 0. In the conventional back propagation system, an updated quantity $\Delta W_{ji}$ and $\Delta W_{ih}$ per unit time are determined as follows and the updating of these weight values are repeated, thereby converging a sum E of the error vectors to a minimum value.

$$\Delta W_{ji} = -\epsilon \frac{\partial E}{\partial W_{ji}} \qquad (17)$$

$$\Delta W_{ih} = -\epsilon \frac{\partial E}{\partial W_{ih}} \qquad (18)$$

where $\epsilon$ ($>0$) represents a learning constant of a learning parameter.

Further, in the conventional back propagation system, in order to accelerate convergence to a minimum value, the data factor relating to the updated quantity of the weight value determined by the previous updating cycle, $\Delta W_{ih}$ and $\Delta W_{ji}$ are determined as follows $$\Delta W_{ji}(t) = -\epsilon \frac{\partial E(t)}{\partial W_{ji}(t)} + \zeta \Delta W_{ji}(t-1) \qquad (19)$$

$$\Delta W_{ih}(t) = -\epsilon \frac{\partial E(t)}{\partial W_{ih}(t)} + \zeta \Delta W_{ih}(t-1) \qquad (20)$$

where ζ (>0) represents the momentum of the learning parameter and t represents the number of updating operations.

In the process of learning the weight value according to the back propagation method, the back propagation method is applied to a learning signal group (a pair comprising an input signal and a teacher signal) provided for a learning. Then the sum E of the error vectors is converged to a minimum value. Thus, the output signal corresponding to the teacher signal can be outputted. Therefore, the learning signal is first determined and then the process of learning the weight value starts. In the process of learning the internal state value, in a data processing system with other network structures and other adaptabilities as well as the data processing apparatus of the layered network structure, a structure in which the process of learning the internal state value starts after the learning signal is first determined for learning the internal state value has been employed.

However, in such prior art technology, as is clear from the explanation of the above back propagation system, the number of calculation steps in the learning process increases exponentially with the number of learning signals provided for learning the internal state value. Therefore, to realize a high degree of data process function, the layered network is made complicated and many learning signals are required to determine the internal state value. Thus, an extremely long time is required for the learning process, thereby causing a problem. For example, if patterns A, B, and C are to be determined first, a learning cycle comprising patterns A, B and C is repeated so that interferences between A and B, B and C, C and A, and A, B and C must be learned to separate patterns A, B, and C. If the number of such patterns increases, interference between them also increases, thus requiring an even longer time.

In the prior art, if an unexpected learning pattern, for example, D, appears, it is added to learning patterns A, B and C obtained up to that point, thereby providing a further pattern D to be learned. Thus, the learning of the internal state value re-starts from the beginning in the sequence A, B, C and D. However, if an adaptive data processing apparatus such as a neural network is used it is difficult to provide all the learning signals which can occurr, from the beginning, in order to avoid the new learning pattern. Therefore, the prior art, has the problem that whenever a new learning pattern is received, a long learning process time is required.

Further, in the above prior art, the number of learning patterns is small and learning has to be repeated for learning signals whose learning has been completed. Therefore, it takes an extremely long time to perform a process of learning an external state value. This problem becomes extremely serious when the layer network for realizing a high degree of data process function becomes complicated and when more learning patterns are required to determine the internal state value.

SUMMARY OF THE INVENTION

The present invention is made in consideration of the above situation and its main object is to provide a learning process in a data processing apparatus for learning an internal state value within a shorter processing time and to determine an internal state value which defines the data processing function of the data processing apparatus with the adaptability to perform a learning process.

Another object of the present invention is to provide a learning process in a data processing apparatus for learning an internal state value within a shorter processing period, even when a new learning pattern is found.

The feature of the present invention resides in a learning process system for use in a data processing apparatus for learning an input pattern by obtaining an internal-state value necessary for realizing the desired data conversion. This system comprises, data processing means for performing a pattern conversion defined by said internal-state value and calculating an output pattern corresponding to said input pattern; pattern presenting means for presenting an input pattern group of the subject to be learned for said pattern conversion, dividing the input pattern group of the subject to be learned into at least two sets, selecting one of the divided sets, presenting the input patterns of the selected set to said pattern conversion and sequentially presenting the input pattern group belonging to all the sets presented up to the current point when the internal state value to be converged is obtained in accordance with the presentation, thereby forming a basic unit for the presentation system; error value calculating means for calculating an error value representing a magnitude of a non-consistence between an output pattern group outputted in accordance with said presentation and a teacher pattern group representing a pattern to be obtained by said output pattern group; and internal-state value updating means for updating an internal-state value in accordance with an updated quantity of the internal-state value calculated based on the error value and for obtaining an internal-state value whose error value holds within a specified allowance.

BRIEF DESCRIPTION OF THE DRAWING

FIGS. 10A to 10D show learning patterns used for experimentation, FIGS. 11A and 11B show the result of the experimentation, FIG. 14A and 14B show experimental data according to the second embodiment of the present invention, FIG. 15A and 15B show experimental data according to the second embodiment of the present invention.

DETAILED DESCRIPTION OF THE PREFERRED EMBODIMENT

Figure 4:
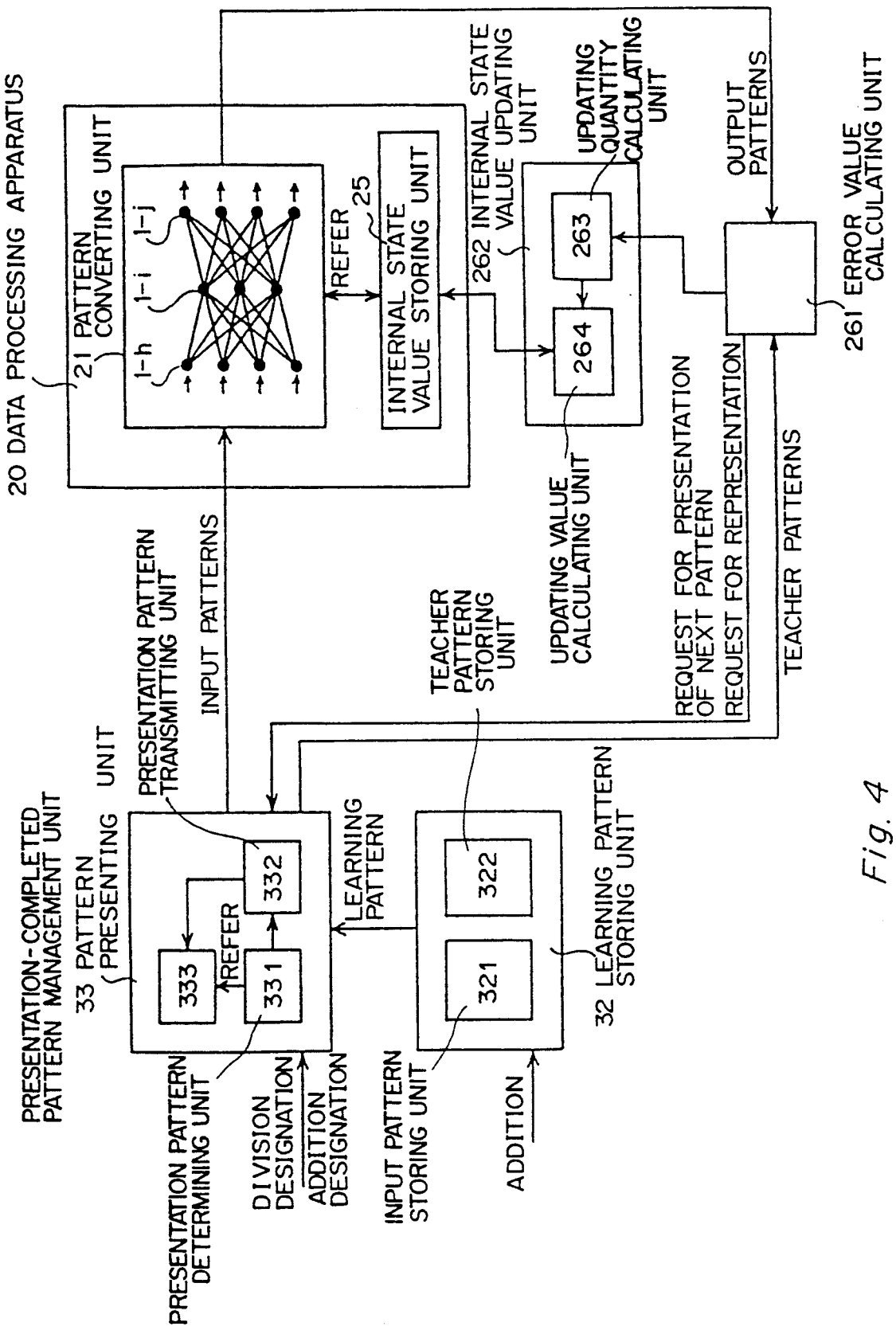
FIG. 4 shows a block diagram showing the principle of an embodiment of the present invention.

FIG. 4 shows a principle structure of an embodiment of the present invention. It comprises an adaptable data processing apparatus 20 which contains a data conversion unit 21 and an internal state value storing unit 25. Data conversion unit 21 calculates an output pattern corresponding to an input pattern and outputs it in accordance with a data conversion function defined by an internal state value. Internal state value storing unit 25 manages the internal state value necessary for carrying out the data conversion process by pattern conversion unit 21. When pattern conversion unit 21 comprises a layered network structure, it receives a plurality of inputs and internal state value (weight value) to be multiplied by these inputs to provide a sum of their products. The sum of the products is converted in accordance with the threshold value function to provide a final output, thereby forming basic unit 1 as the basic unit. Basic unit 1 forms an input layer by using a plurality of basic units 1-$h$ and forms an hidden layer in which a plurality of basic units 1-$i$ is provided in a single stage or plurality of stages. An output layer is constituted of a plurality of basic units 1-$j$, and an internal-connection is performed between basic units 1-$h$ and 1-$i$, between respective basic units 1-$i$, and between basic units 1-$i$ and 1-$j$. Further, a layered network structure is realized in accordance with internal state values determined by respective connections.

Learning pattern storing unit 32 stores a learning pattern necessary for the process of learning an internal state value. It comprises an input pattern storing unit 321 for storing a plurality of input patterns provided for the learning process and a teacher pattern storing unit 322 for storing a teacher pattern to be provided as an output pattern corresponding to the input pattern. Pattern presentation unit 33 reads a group of learning patterns as a subject of a learning from learning pattern storing unit 32, presents the input pattern group to pattern conversion unit 21, and distributes the teacher pattern group among the input pattern group in the later described error value calculating unit 261. Pattern presenting unit 33 comprises presentation-pattern determining unit 331, presentation-pattern transmitting unit 332 and presentation-completed pattern-management unit 333 for carrying out the presentation process. Presentation-pattern determining unit 331 divides the learning pattern group stored in learning-pattern storing unit 32 into at least two sets for each management thereof and determines the learning pattern group to be presented, by using the divided sets as one unit. Presentation pattern transmitting unit 332 carries out the presentation process of the learning pattern group determined by the presentation-pattern determining unit 331 and presentation completed pattern management unit 333 manages the learning pattern group whose presentation is already completed by presentation pattern transmitting unit 332.

Error value calculating unit 261 calculates the error represented by the amplitude of the non-coincidence between the output pattern group outputted from the pattern conversion unit 221 in accordance with the input pattern group and the teacher pattern group presented by pattern presenting unit 33. An internal state-value renewing unit 262 updates an inner state value stored in internal-state-value storing unit 25 in synchronization with the updating cycle. An updating quantity calculating unit 263 is provided in the internal state value updating unit 262 and this unit calculates the updating quantity of the internal state value necessary for determining the internal state value in the following starting cycle based on the error values calculated by the error calculating unit 261. An updating value calculating unit 264 is provided in the internal state value updating unit 262 and this unit calculates the internal state values used by the following updating cycle in accordance with the updating quantity calculated by updating quantity calculating unit 263.

According to the present invention, when the presentation pattern determining unit 331 receives an instruction to select a new learning pattern group from error value calculating unit 261, it selects a previously unselected set (for example, set B) from the divided sets (for example, sets A and B), and determines the learning patterns of the selected set (for example, set B) as the learning pattern set for the following learning operation. When it receives this determination, presentation pattern transmitting unit 332 presents respective input patterns of the determined input pattern set to the pattern conversion unit 21 and sequentially presents the teacher patterns paired with the presented input patterns to error-value calculating unit 261.

When the input pattern group is presented to pattern conversion unit 21, pattern conversion unit 21 refers to an internal state value of internal-state-value storing unit 25, calculates the output patterns for respective input patterns, and outputs them. Error value calculating unit 261 thus receives the output patterns relating to the presented input patterns and corresponding teacher patterns. It then calculates the error values and determines whether or not it, or another value relating to it, are in a predetermined range. If they are judged as being within a predetermined range, the error value calculating unit 261 judges that the internal state value has then been subjected to convergence and designates the pattern presentation unit 33 to select the next new learning pattern group.

If they are judged as not being within the predetermined range, updating-quantity calculating unit 263 calculates the quantity by which the internal state value should be updated and thus obtains the internal state value to be used for the following updating cycle to determine the internal state values in the internal state value storing unit 25. Then error value calculating unit 261 presents the same learning pattern group again to the pattern presenting unit 33 to realize the convergence of the internal state values.

When presentation pattern determining unit 331 receives an instruction to select the following learning pattern group from error value calculating unit 261, it refers to the presentation-completed pattern management unit 333. It thus selects the learning pattern group for the following learning process from all the sets (for example, sets A and B) presented up to this point. The present invention uses a basic method for presenting the learning patterns belonging to all the sets (for example, sets A and B) presented up to this point, following presentation of the learning patterns which belong to a set (for example, set B) of previously presented learning patterns. For divided pattern sets A, B and C, the interference between sets A and B (expressed as A+B) are learned and then set C is learned. Thus, interference between A, B and C (expressed as A+B+C) is learned. A learning pattern group which is presented for the first time (for example, set A) is presented by itself as the basic unit. If the same pattern is repeatedly presented as the basic unit, it means that the learning pattern is already converged, and thus, it proceeds immediately with the next learning pattern, thereby showing no substantial difference. When the learning pattern group divided in the above sequence is presented, internal-state value updating unit 262 of the present invention first provides the internal state value converged in accordance with the previously presented learning pattern set (for example, set A) as an initial value and then obtains the internal-state values converged for the presented learning pattern set (for example, set B).

That is, learning pattern sets comprising small numbers of learning patterns are presented sequentially and the internal-state values are made close to the converged ones. Further, in order to correct errors caused in accordance with the presentations performed up to this point, when the value approaches the converged internal-state value, the learning patterns belonging to all the sets presented up to this point are presented as a part of the learning process.

With such a structure, even fi a new learning pattern is added to pattern presenting unit 33 after a completion of a learning of an internal state value or during a learning process, presentation pattern determining unit 331 presents to pattern conversion unit 21 a set of added input patterns, or a plurality of sets of added and divided input patterns, or the added input patterns combined with the original input patterns so that the original input patterns and added input patterns are divided into a plurality of input pattern sets. Therefore, a new required internal state value can be obtained much more quickly, namely, within a much shorter time than in the conventional method.

According to the present invention, a learning is performed in accordance with a presentation of a learning pattern set comprising a small number of learning patterns. Thus, converged internal state values for respective presentations can be obtained in an extremely small number of calculation steps and convergence of the internal state value obtained from the presentation of the learning pattern set (for example, set A+B) and used to correct the error up to this point can be also obtained in a extremely small number of calculating steps as it has come very close to the converged internal state value. Therefore, the learning of the internal state value can be carried out more quickly than in the conventional technology. Even if an unexpected learning pattern is found, its internal-state value can be learned more quickly than in the conventional method.

According to the above explanation, a function for detecting completion of learning of respective learning pattern sets is provided in error value calculating unit 261. A unit for performing the function of detecting a learning completion may be provided on the side of pattern presentation unit 33. This makes it unnecessary for error value calculating unit 261 to request the pattern presentation unit 33 to present the learning pattern.

The present invention will be explained in detail by referring to the embodiment which utilizes a back propagation method in a data processing apparatus with a layered network structure.

Figure 3:
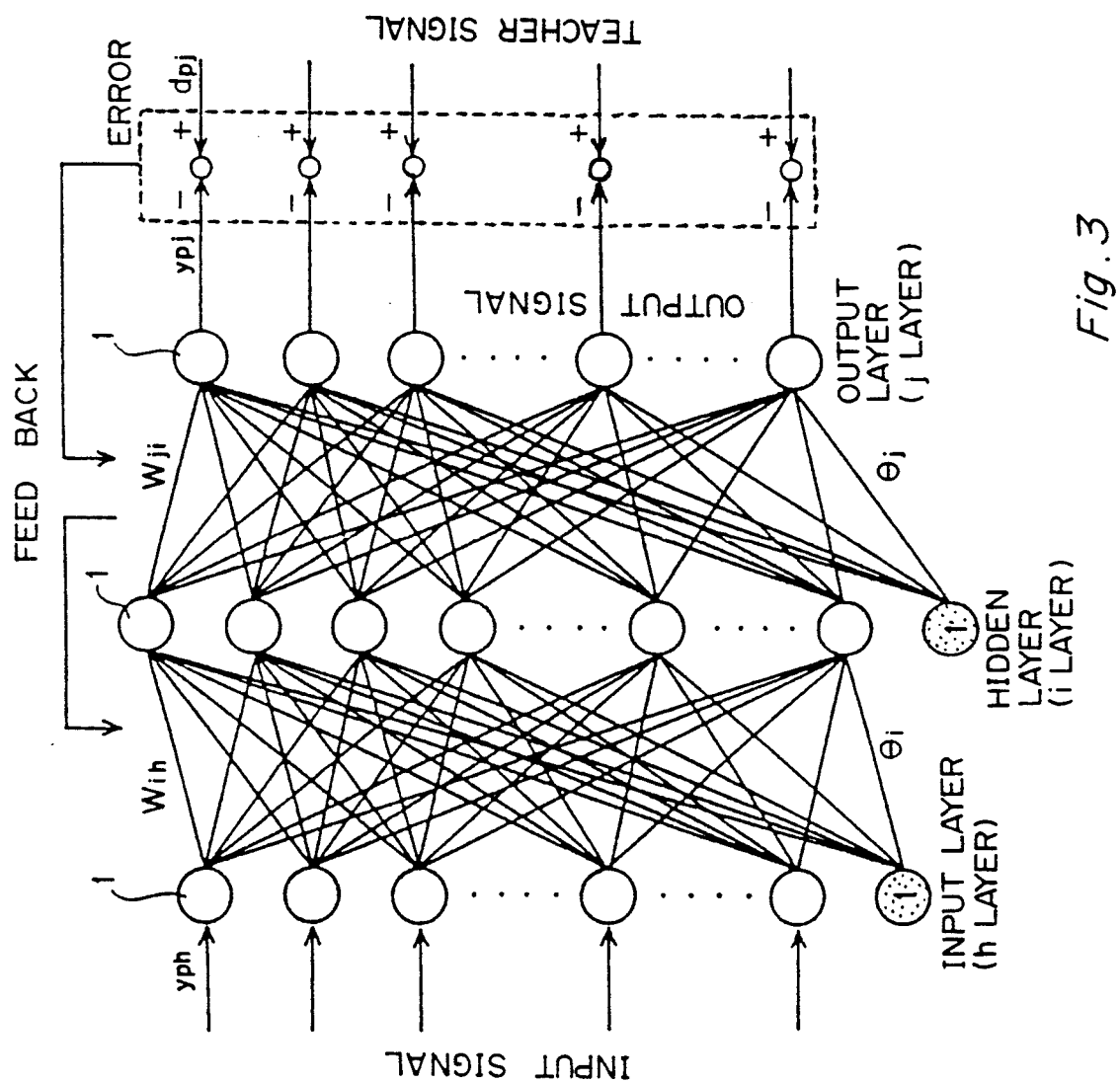
FIG. 3 shows a block diagram for explaining a back propagation method.
Figure 5:
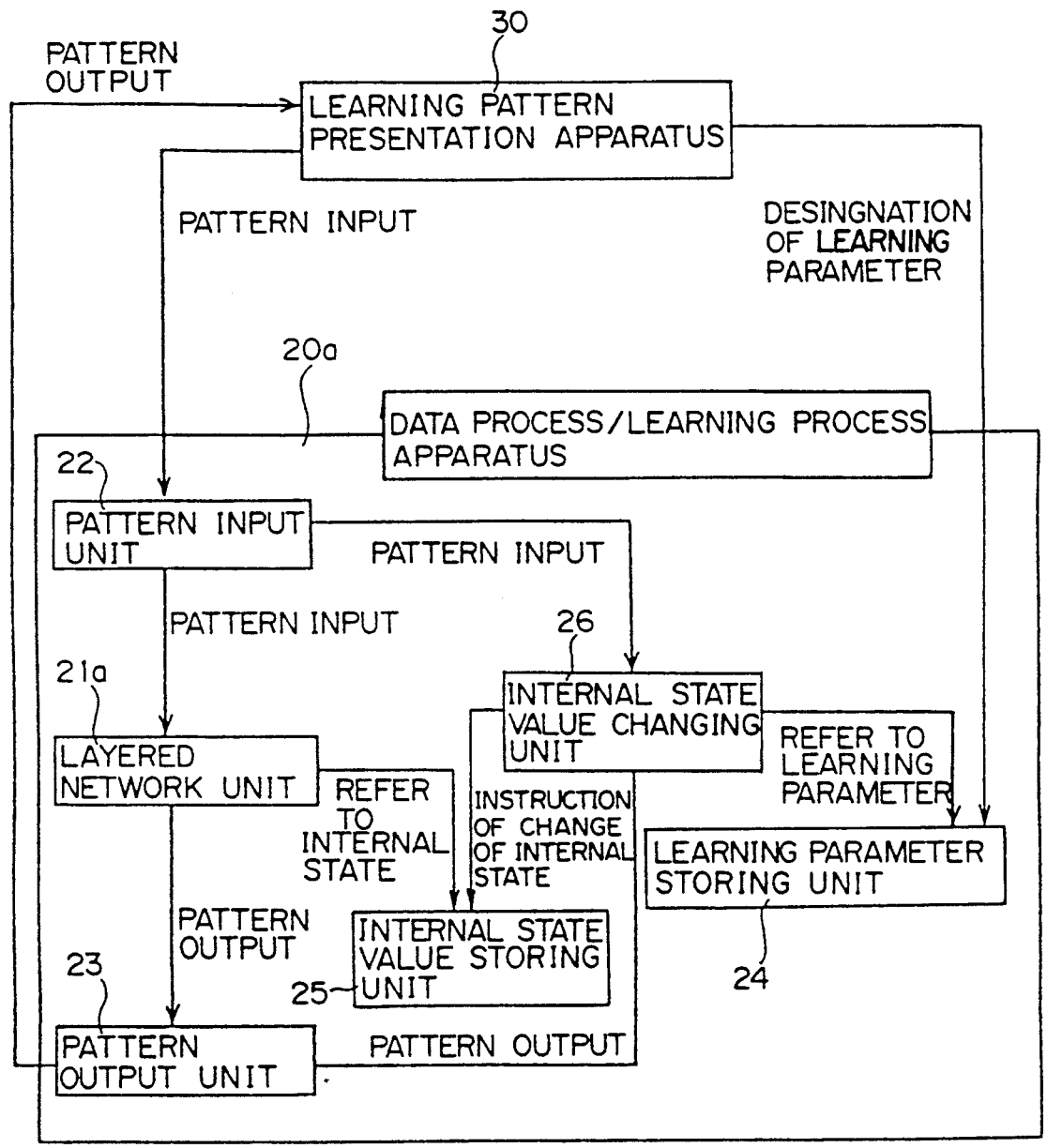
FIG. 5 shows a block diagram of a learning process apparatus according to the present invention.

FIG. 5 shows the structure of a layered network data-processing apparatus 20a equipped with a learning process apparatus to which the present invention is applied. Parts which are the same as those in FIG. 4 are designated by the same reference numbers. Layered network unit 21a, which has a layered network structure as shown in FIG. 3, calculates the output pattern corresponding to the input pattern in accordance with a data conversion function defined by a weight value and outputs it. Pattern input unit 22 inputs to layered network unit 21a the input pattern within the learning pattern presented by learning-pattern presentation apparatus 30. It also inputs the teacher pattern to later described internal-state-value changing unit 26. Pattern output unit 23 receives the output pattern from layered network unit 21a and outputs it to learning pattern presentation apparatus 30 and to internal-state-value changing unit 26. Learning-parameter storing unit 24 stores a learning constant ($\epsilon$) and momentum "$\zeta$" of the learning parameter explained in the above back propagation method. Internal-state-value changing unit 26 provides a function to error value calculating unit 261 and internal state value updating unit 262, as shown FIG. 4. The function of judging the convergence of the weight value in this embodiment is explained as a part of a function of error value calculating unit 261. This is realized by later described learning convergence judging unit 36. The weight value of an internal connection in layered network unit 21a is processed so that it converges to a desired value through an updating process. Internal state value storing unit 25 stores a weight value of the layered network as an internal state value for layered network unit 21a and internal state value changing unit 26 updates the weight value.

Figure 6:
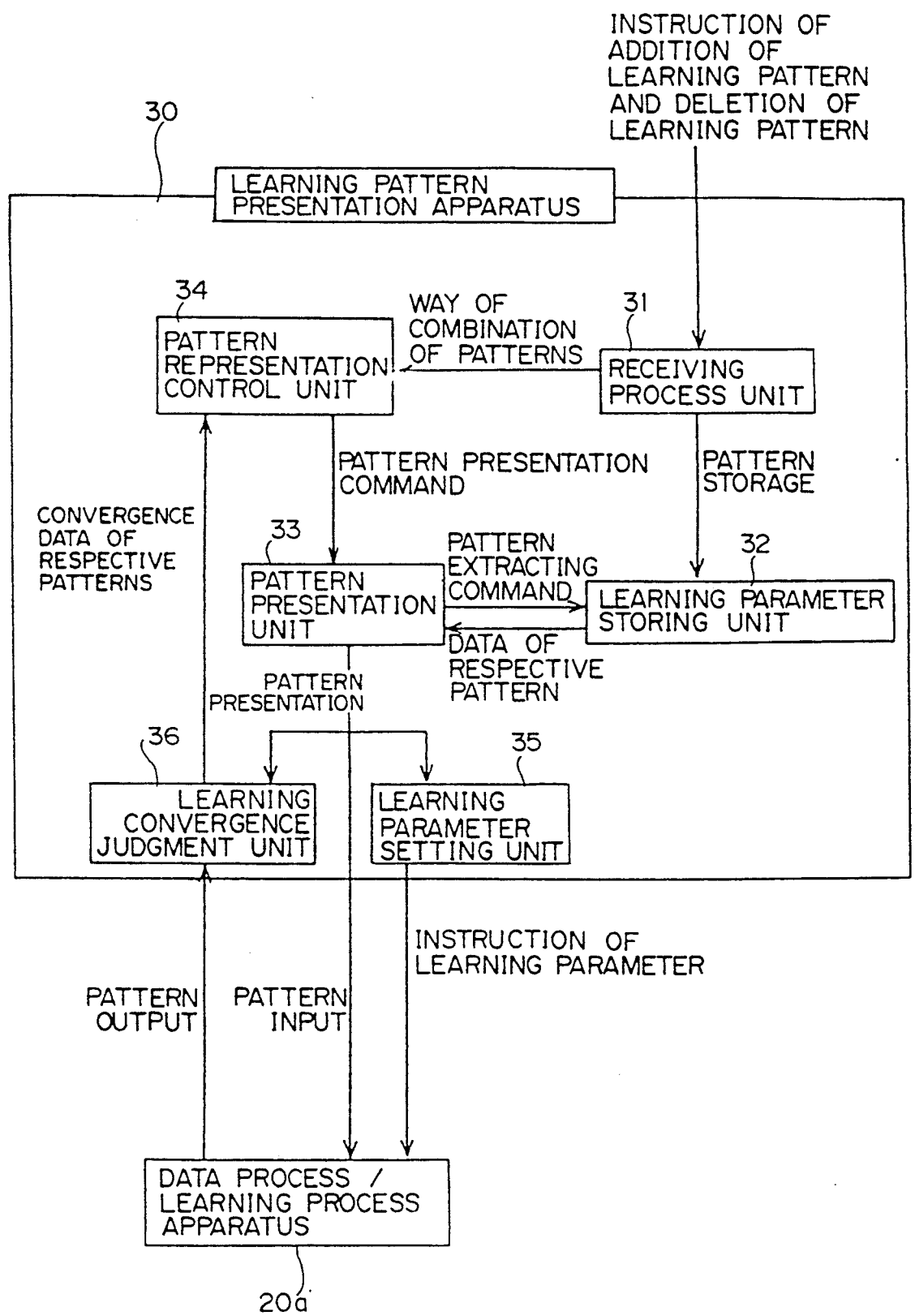
FIG. 6 shows a block diagram of the learning pattern presenting apparatus of the present invention.

FIG. 6 shows the structure of learning pattern presentation apparatus 30 realized by the present invention. This apparatus presents a learning pattern pair comprising an input pattern and a teacher pattern to layered network-structure data-processing apparatus 20a, thereby realizing the learning process of the present invention. In FIG. 6, the same parts as in FIG. 4 are represented by the same reference numbers. Receiving process unit 31 performs a receiving process for a pattern inputted as a learning pattern to be added to a receipt process for an instruction of a division for a learning pattern group stored in learning pattern storing unit 32. In accordance with an instruction of a division received by the receipt process unit 31, pattern presentation control unit 34 transmits to pattern presentation unit 33 a pattern presentation command designating the kind of learning pattern to be presented. Learning parameter setting unit 35 sets a learning parameter in learning parameter storing unit 24 of layered-network-structure data-processing apparatus 20a. Then, learning-convergence judging unit 36 receives an output pattern from pattern-outputting unit 23 of layered-network-structure data-processing apparatus 20a, judges whether the weight value then being learnt is entered in an allowance scope or not, and notifies the judgement result to pattern presentation control unit 34.

The present invention is characterized by dividing a learning pattern group used for learning a weight value into several sets or classes for a management. This management uses a division process and is conducted for the first determined learning pattern. Furthermore, when at a later stage, a new pattern is added to the original one, management by division of the learning pattern is also applied to the new learning pattern. For designating the division in this adding process, various methods can be employed, for example, treating added learning pattern group as one set, dividing the added learning pattern group into a plurality of sets for processing where the learning pattern to be added is added to during learning of the learning pattern group defined from the beginning, or combining the original learning pattern group and the learning pattern to be added by using a method of dividing the input pattern group, and the learning pattern into a plurality of the learning pattern sets. Receipt processing unit 31 carries out a receipt process for designating this division inputted by the operator.

Figure 7A:
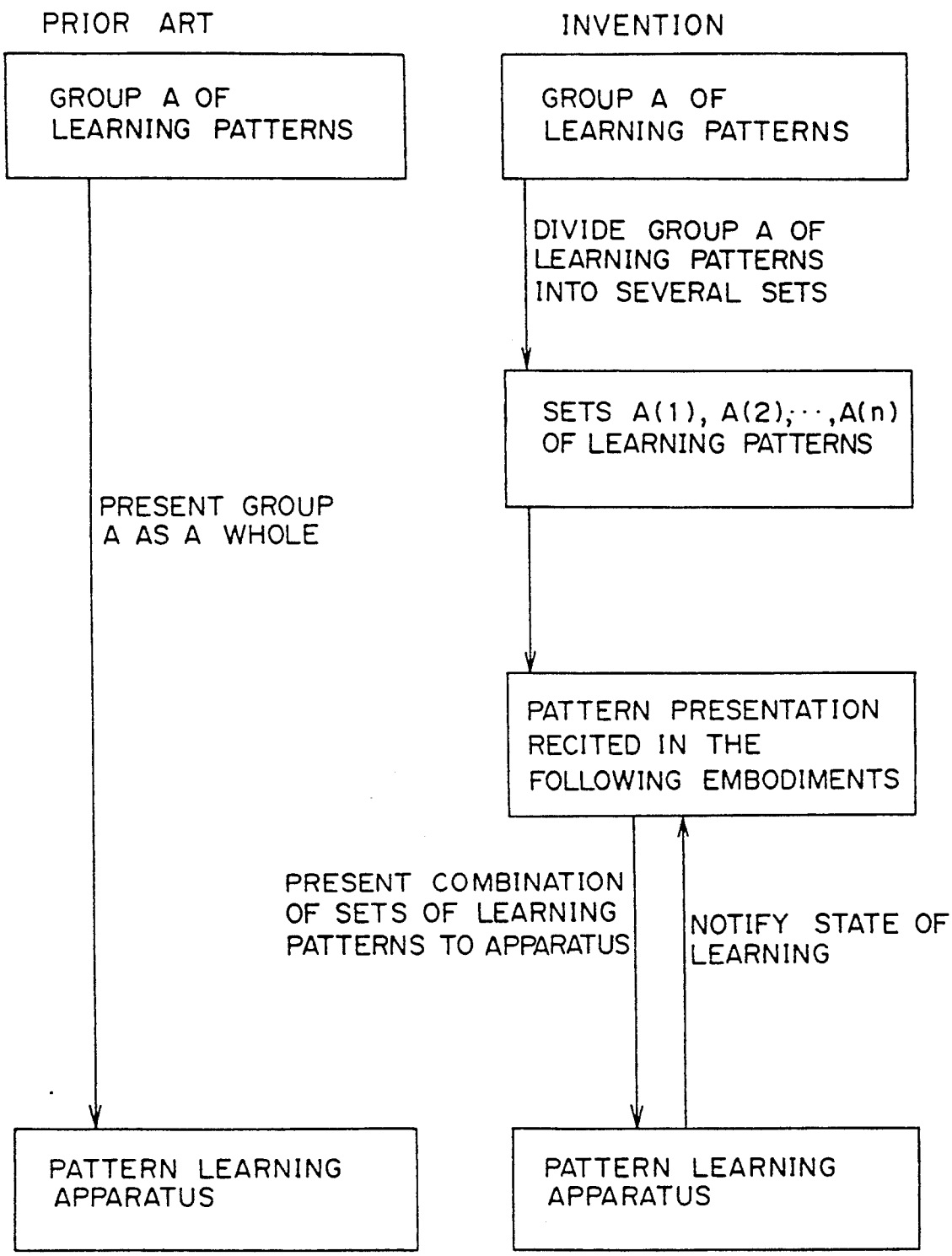
FIG. 7A shows a flowchart representing a basic concept of the present invention by comparing a prior art method.

FIG. 7A shows the system of the present invention and the prior art system. The group of learning patterns are divided into several sets of patterns A1, A2 ... An in accordance with the present invention. Then, the pattern presentation method, later described in following embodiments, is applied to these sets, so that the pattern learning system can learn them. That is, the learning process is repeated for learning pattern set A1, for example, until it converges and then it proceeds to pattern set A2. However, in the prior art, the pattern learning apparatus learns the learning pattern group A as a whole, without dividing it. That is, the learning process is repeated for learning pattern group A.

Figure 7B:
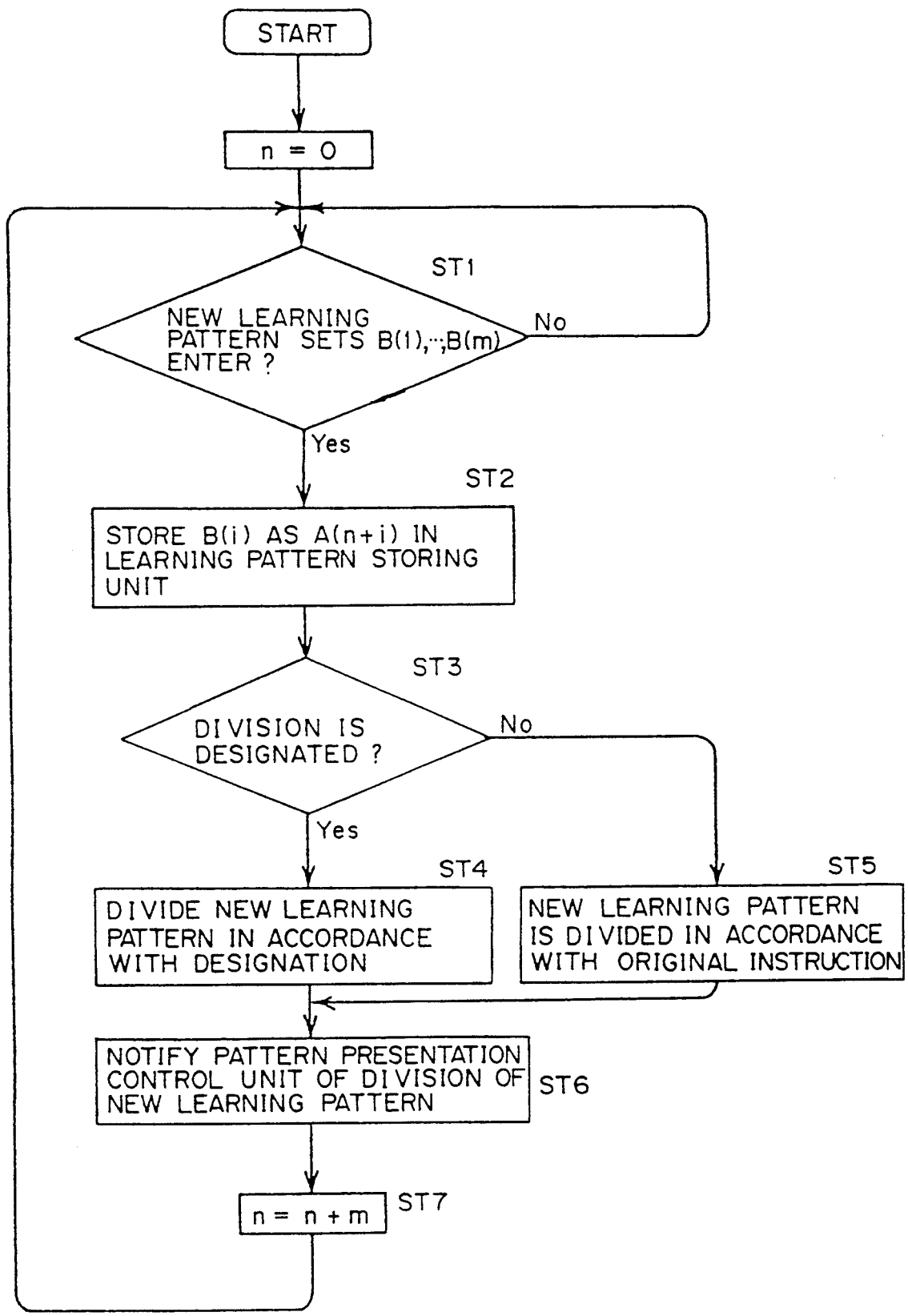
FIG. 7B shows a flowchart for operation of the receiving data according to the present invention.

FIG. 7B shows a flowchart of an example of a receipt process carried out by receipt processing unit 31. In this example, a learning pattern is added after it has been learnt. Receipt process unit 31, as shown in the flowchart, detects an input of a new learning pattern at step ST1 and adds and stores the received learning pattern into learning pattern storing unit 32 at step ST2. At step ST3, it is judged whether the learning pattern is instructed to be divided or not.

When a division is instructed, a newly inputted learning pattern is divided in accordance with the instruction at step ST4 and the classification manner is transmitted to pattern representation control unit 34 at step ST6. Conversely, when a division instruction is not inputted, the newly inputted learning pattern is divided in accordance with the original instruction at step ST5 and the division manner is transmitted to pattern presentation control unit 34 at step ST6. Finally, at step ST7 the number of stored patterns managed by learning pattern storing unit 32 is set to the new number and the process returns to step ST1.

As described above, pattern presentation control unit 34 of the present invention divides a plurality of learning patterns stored in learning pattern storing unit 32 into a plurality of sets in accordance with a designated method and manages the sets. This is explained by using the example of a learning pattern for the Roman alphabet, comprising 26 characters from a to z. In the prior art, these characters are managed as a single learning pattern group. However, in the present invention they are divided into a plurality of sets, as described below.

$\alpha = \{A, B, C, D, E, F, G\}$ $\beta = \{H, I, J, K, L, M\}$ $\gamma = \{N, O, P, Q, R, S, T\}$ $\delta = \{U, V, W, X, Y, Z\}$ Pattern presentation control unit 34 of the present invention controls pattern presentation unit 33 in accordance with a pattern presentation command. Pattern presentation unit 33 selects one of divided sets from learning pattern storing unit 32, reads the selected set and processes it by presenting it to pattern input unit 22 as the learning pattern. Following presentation of the previously presented learning pattern set, the learning patterns belonging to all the sets of learning patterns presented up to this point are re-presented, thereby carrying out a presentation of the learning pattern group. For sets A, B and C, interference between sets A and B is learnt before C is learnt and then set C is learned. Thereafter, interference between sets A, B and C is learnt, Thus, interference between all the sets is learnt. Following the first presented learning pattern sets, the remaining set of the basic unit is presented and therefore the remaining set is presented by itself. The same learning pattern can be repeatedly presented in accordance with the method of presenting the basic unit.

Figure 8:
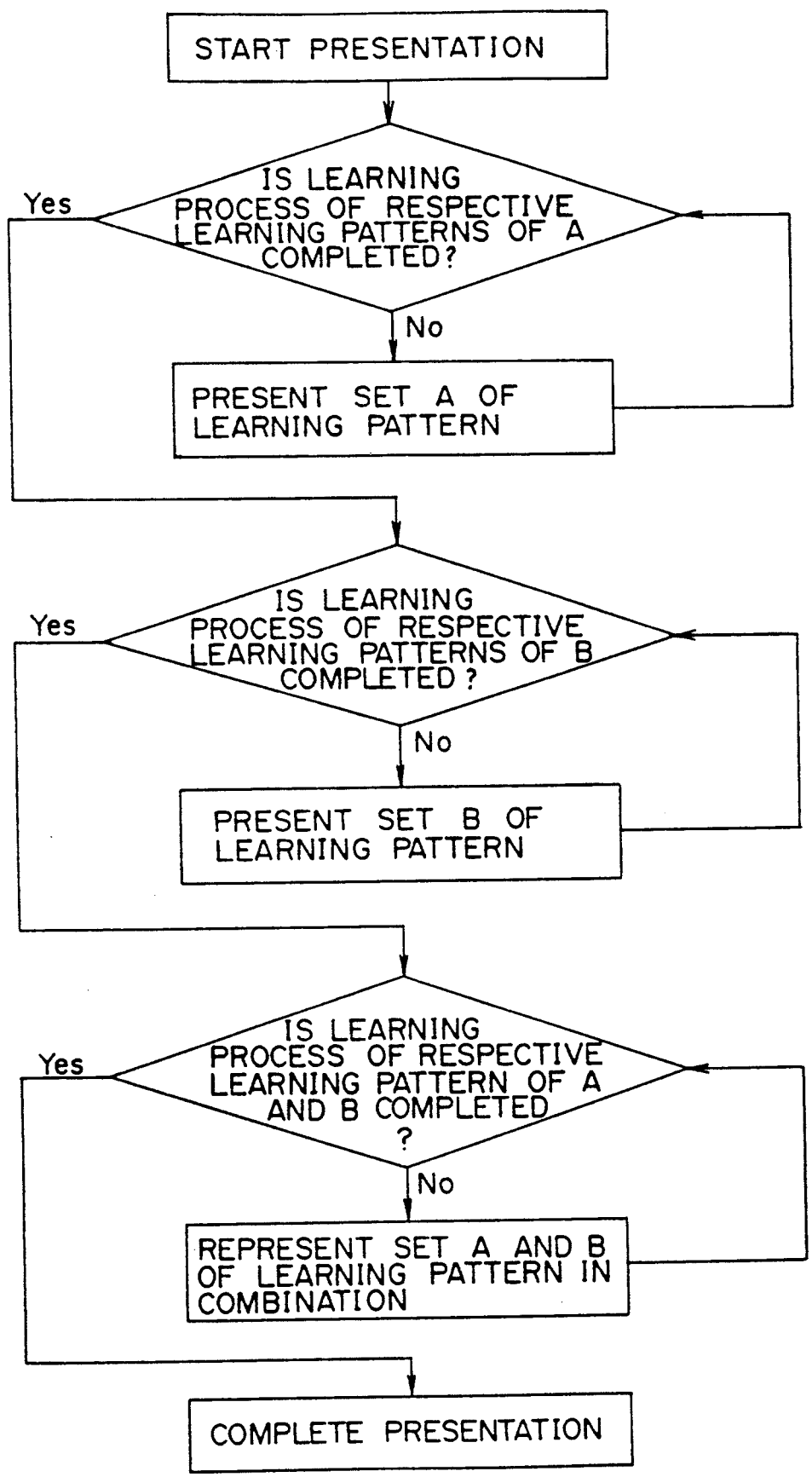
FIG. 8 shows a flowchart for explaining the operation of the pattern presentation control unit.

FIG. 8 shows a flowchart of a control of the presentation process where the learning pattern group is divided into two sets. In this case, pattern presentation control unit 34 first controls pattern presentation unit 33 so that respective learning patterns belonging to set A, which is one of the sets, are presented to pattern input unit 22. Upon receiving the presentation of the pattern set A, internal state value changing unit 26 then learns the weight values of a layered network which are converged to the learning patterns belonging to set A. Sequentially, pattern presentation control unit 34 presents respective learning patterns belonging to set B, which is the other of the sets, to pattern input unit 22. Upon receiving the presentation of the pattern set B, internal state value changing unit 26 then learns the weight values of a layered network which are converged to the learning patterns belonging to set B. Finally, pattern presentation control unit 34 presents respective learning patterns of the learning patterns belonging to sets A and B to pattern input unit 24. Upon receiving this presentation of sets A and B internal state value changing unit 26 then learns the converged weight value of the layered network.

When, after sets A and B have been learnt, the data group comprises sets A and B, it cannot be said that the internal weight data value is converged to A and B. This is because the output from data set A is destroyed and the interference between data sets A and B has not been learnt. Therefore, in the invention, after sets A and B are respectively learnt, the interference between them is learnt. Expression set A+B means that data sets A and B, and the interference between them are learnt.

Figure 9:
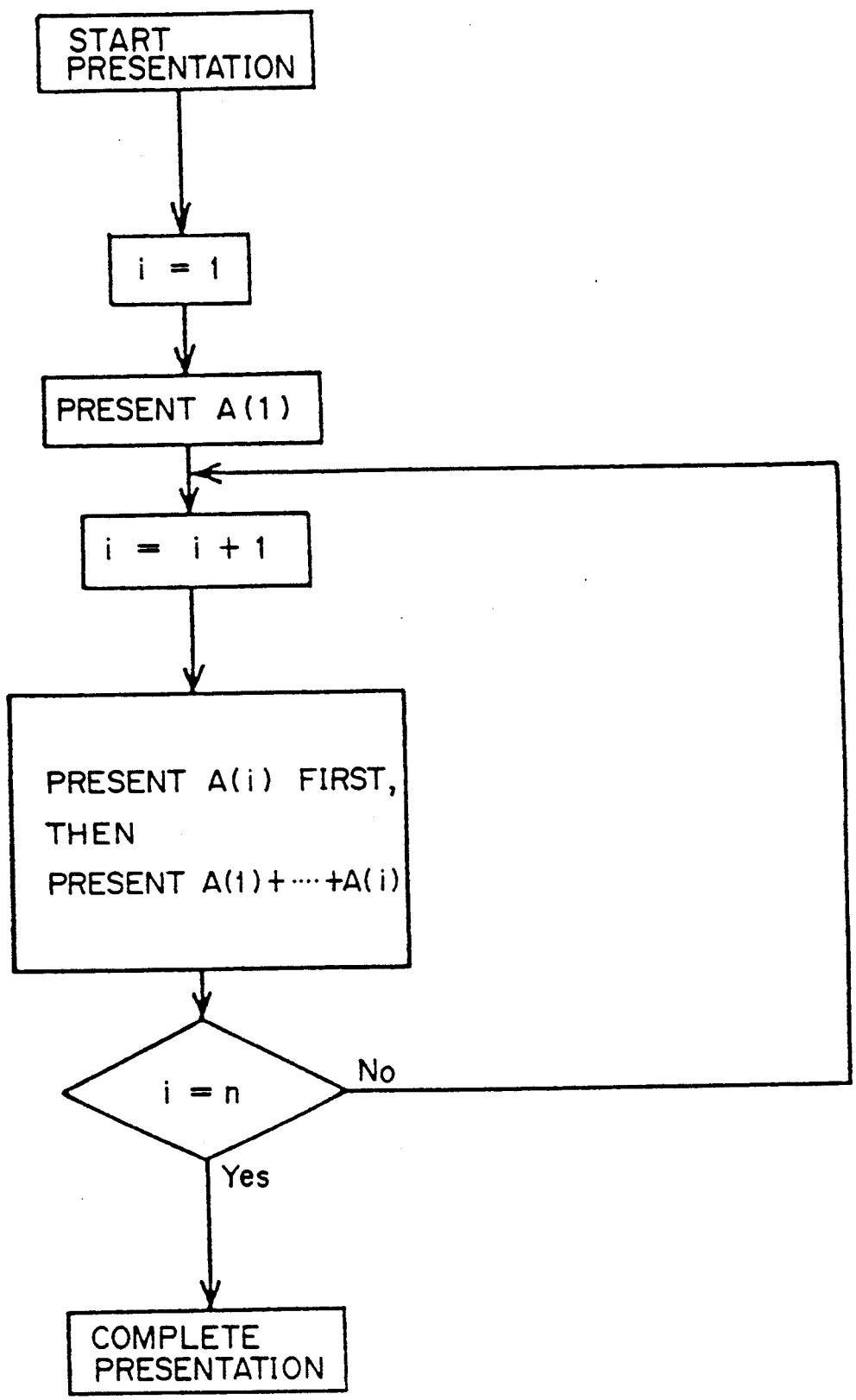
FIG. 9 shows a another flowchart for explaining the operation of the pattern presentation control unit.

FIG. 9 shows a flowchart of a process for controlling a presentation of a learning pattern where the learning pattern group is divided into more than two sets. When the learning pattern group is divided into more than two sets, pattern presentation control unit 34 presents respective learning patterns belonging to the set Ai to pattern input unit 22 and sequentially presents the learning patterns belonging to set A (1)+...+set A (i) which are the learning patterns presented up to this point, thereby providing a basic unit process for carrying out a presentation of the learning patterns. An example of a division of the learning pattern using the 26 Roman characters is as follows.

$\alpha = \{A, B, C, D, E, F, G\}$ $\beta = \{H, I, J, K, L, M\}$ $\gamma = \{N, O, P, Q, R, S, T\}$ $\delta = \{U, V, W, X, Y, Z\}$ The above is explained more specifically as follows:
(1) learning pattern set $\alpha$ is presented, repeatedly,
(2) learning pattern set $\beta$ is presented, repeatedly,
(3) a cycle comprises learning pattern sets $\alpha$ and $\beta$ is presented, repeatedly (to learn set $\alpha + \beta$)
(4) learning pattern set $\gamma$ is presented, repeatedly
(5) a cycle comprising learning pattern sets $\alpha$, $\beta$ and $\gamma$ is presented repeated (to learn set $\alpha + \beta + \gamma$)
(6) learning pattern set $\delta$ is presented, repeatedly
(7) a cycle comprising the learning pattern sets $\alpha$, $\beta$, $\gamma$ and $\delta$ is presented repeatedly (to learn set $\alpha + \beta + \gamma + \delta$).

The learning pattern is presented in accordance with the above sequence.

The process of updating the weight value carried out in state value changing unit 26 in accordance with the presentation of the learning pattern, can be carried out as in the conventional back propagation method, except that the weight value obtained in accordance with presentation made up to this point is used as an initial value of the weight value to be updated.

That is, pattern presentation unit 33 sequentially presents respective learning patterns (each comprising a pair of an input pattern and a teacher pattern) of the selected learning pattern sets and layered network 21a obtains the outputs "$y_{ph}$", "$y_{pi}$" and "$y_{pj}$" outputted from the layered network structure for every input pattern. Internal state value changing unit 26 obtains "$\delta_{pj}$" of the error between "$y_{pj}$" and teacher pattern "$d_{pj}$". Next, internal state value changing unit 26 provides the following equation using the obtained "$\delta_{pj}$", "$y_{ph}$", "$y_{pi}$", and "$y_{pj}$" derived from equation (11).

$$\frac{\partial E_p}{\partial W_{ji}} = \delta_{pj} y_{pj} (1 - y_{pj}) y_{pi}$$

Then, internal-state-value changing unit 26 provides the following equation, derived from equation (14).

$$\frac{\partial E_p}{\partial W_{ih}} = \left( \sum_j \delta_{pj} y_{pj} (1 - y_{pj}) W_{ji} \right) y_{pi} (1 - y_{pi}) y_{ph}$$

The calculating process is conducted for all the learning patterns of the selected leaning pattern sets.

Next, internal state value changing unit 26 uses the value obtained by the above calculation process derived from equation (15).

$$\frac{\partial E}{\partial W_{ji}} = \sum_p \frac{\partial E_p}{\partial W_{ji}}$$

The internal state value changing unit 36 provides the following equation.

$$\frac{\partial E}{\partial W_{ih}} = \sum_p \frac{\partial E_p}{\partial W_{ih}}$$

The updating quantities $\Delta W_{ji}(t)$ and $\Delta W_{ih}(t)$ of the weight value which decrease the sum "E" of the error vector are obtained from $$\Delta W_{ji}(t) = -\epsilon \frac{\partial E(t)}{\partial W_{ji}(t)} + \zeta \Delta W_{ji}(t-1)$$

$$\Delta W_{ih}(t) = -\epsilon \frac{\partial E(t)}{\partial W_{ih}(t)} + \zeta \Delta W_{ih}(t-1)$$

The new weight values, $\Delta W_{ji}$ and $\Delta W_{ih}$ are obtained by using the above updating quantities, as follows.

$$W_{ji}(t) = W_{ji}(t-1) + \Delta W_{ji}(t)$$

$$W_{ih}(t) = W_{ih}(t-1) + \Delta W_{ih}(t)$$

The obtained weight value is stored in internal state value storing unit 25.

Learning convergence judgment unit 36 obtains the error "$\delta_{pj}$" between the output from the layered network unit 21a and the teacher pattern for every learning pattern of the selected learning pattern set by the same process as in internal state value changing unit 26. Learning convergence judgement unit 36 obtains the sum "E" of the error vectors using the obtained "$\delta_{pj}$" in accordance with equations (7) and (8) and judges whether or not the value of "E" is acceptable or allowable. It thereby determines whether or not the weight value is converged and notifies the judgement result to pattern presentation control unit 34. Instead of using the above convergence judgement method, convergence can be judged based on the fact that all "$\delta_{pj}$" become smaller than a predetermined value.

As described above, pattern presentation control unit 34 determines that the learning process for the selected learning pattern set does not end upon receipt of a non-convergence notification from learning convergence judgement unit 36. As in the prior art, pattern presentation control unit 34 transmits a command to re-present the same learning pattern set, to pattern presentation unit 33 in order to realize the convergence. On the other hand, when pattern presentation control unit 34 receives a convergence notification from learning convergence judgement unit 36, pattern presentation control unit 34 judges that the learning process for the selected learning pattern set is completed, determines a learning pattern set to be presented next in accordance with the above algorithm, and transmits the command to present the determined learning pattern set to pattern presentation unit 33. Therefore, the learning of the weight value proceeds according to the same learning process as for the previously presented learning pattern set. At this time, the convergence weight value for the previously presented learning pattern set is used as the initial weight value.

As described above, the present invention sequentially presents the learning pattern set comprising a small number of learning patterns so that the weight value sequentially approaches the converged one. Further, in order to correct errors occurring up to this point in the weight value which approaches the converged one in accordance with the presentation made up to this point, all the sets of the learning pattern group presented up to this point, following the presentation of the respective learning pattern sets are presented.

The present invention's method for learning input pattern sets in the sequence A, B, A+B, C, A+B+C is more advantageous than the prior art method of learning sets in the sequence A, B, C, A+B+C for the following reason. In the present invention, if set A+B is learned, the interference between sets A and B is already learned. Therefore, in this invention, when the pattern set A+B+C is being learned, only the interference between sets A+B and C may be learned. In contrast in the process of learning pattern sets A+B+C, the interference between all the data including set C have to be learnt. Learning of the interference between patterns is related to an increase in the amount of learning when the number of data increases. Therefore, the present invention is more advantageous than the prior art.

Another reason why the present invention is more advantageous than the prior art is as follows.

When the network learns data sets A and B, the present invention and the prior art operate in the same way. Let us suppose that the network has already learnt data sets A and B. Then, when a new learning data set C is added to the network, the prior art method has to start the learning from the beginning. The present invention, however, needs only learn set C. It can then learn set A+B+C as set A+B has already been learnt. Therefore, the present invention is faster than the prior art in which learning the patterns is presented in the sequence A, B, C, and A+B+C or learning the pattern set A+B+C is presented from the beginning.

Next, the advantage of a method of presenting the learning pattern of the present invention is explained with reference to experimental data.

Figure 10A:
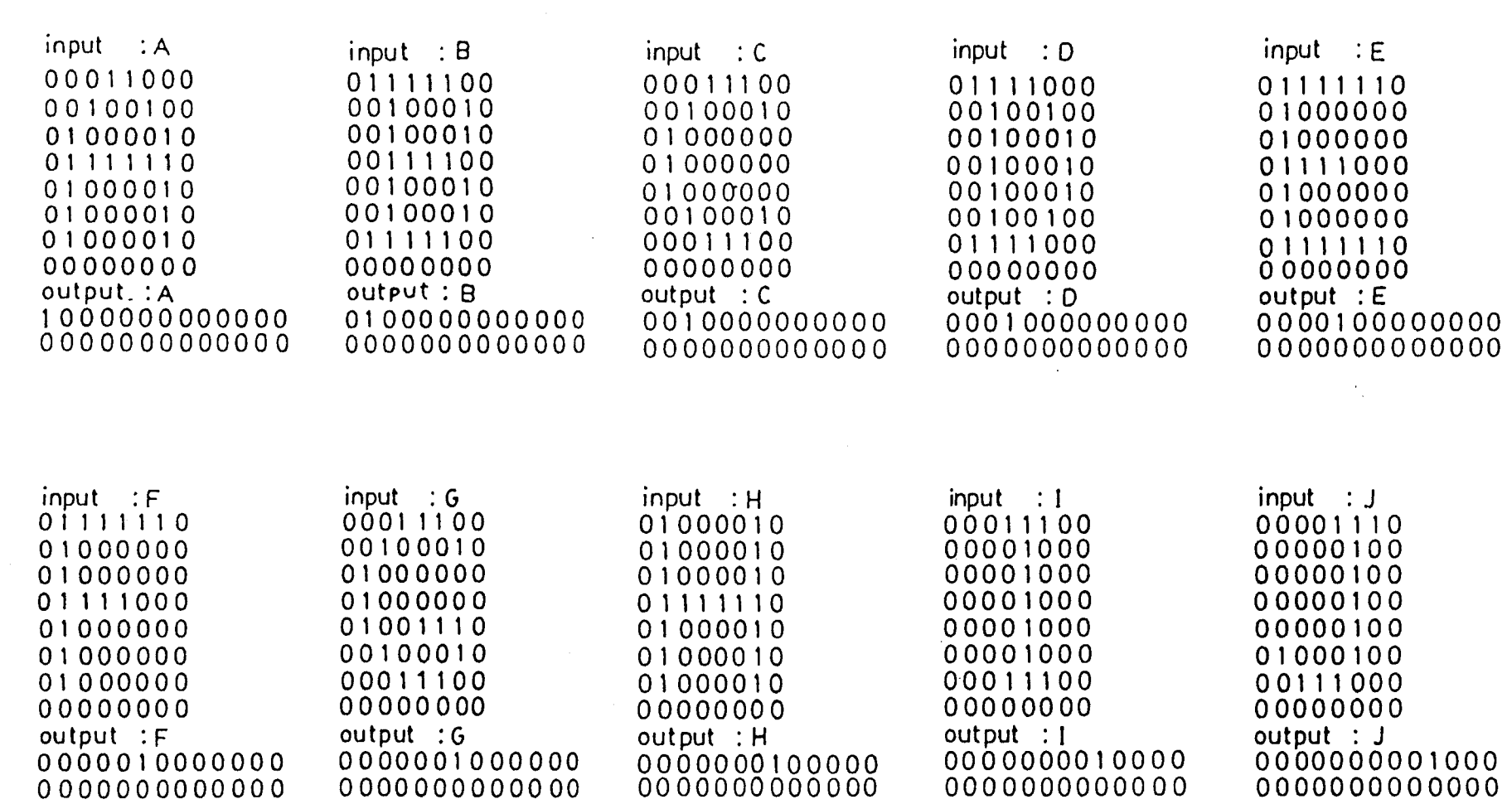
Figure 10B:
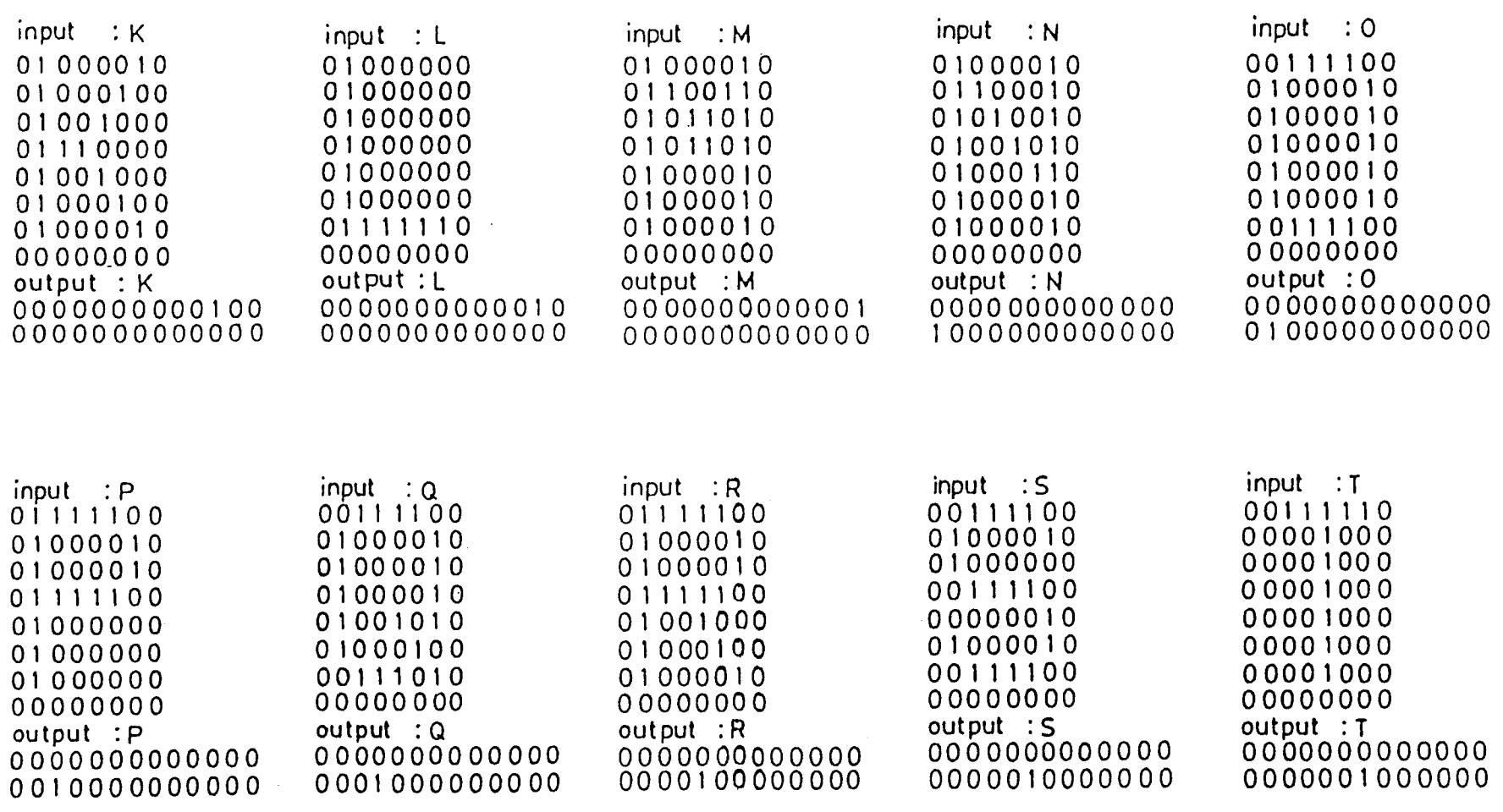

The experiment compared the number of learnings of a weight value which distinguishes or identifies 26 Roman characters each comprising 8×8 dots. FIGS. 10A to 10C show an example of an input pattern comprising the 26 Roman characters and the teacher pattern used for experimentation. The teacher pattern is determined by a position of a bit "1" in the output. The layered network unit 21a used for the experimentation is constructed with 64 basic units in the input layer corresponding to the 8×8 dots, 26 basic units in the output layer corresponding to the 26 Roman characters, and 15 basic units in the hidden layer. The 26 Roman characters, in addition to the method in which they are undivided, may be divided into two sets as shown below, $\alpha = \{A,B,C,D,E,F,G,H,I,J,K,L,M\}$ $\beta = \{N,O,P,Q,R,S,T,U,V,W,X,Y,Z\}$ into three sets as shown below, $\alpha = \{A,B,C,D,E,F,G,H,I\}$ $\beta = \{J,K,L,M,N,O,P,Q,R\}$ $\gamma = \{S,T,U,V,W,X,Y,Z\}$ or into four sets as follows.

$\alpha = \{A, B, C, D, E, F, G\}$ $\beta = \{H, I, J, K, L, M\}$ $\gamma = \{N, O, P, Q, R, S, T\}$ $\delta = \{U, V, W, X, Y, Z\}$ Experimentation can be conducted for all the above cases.

Figure 11B:
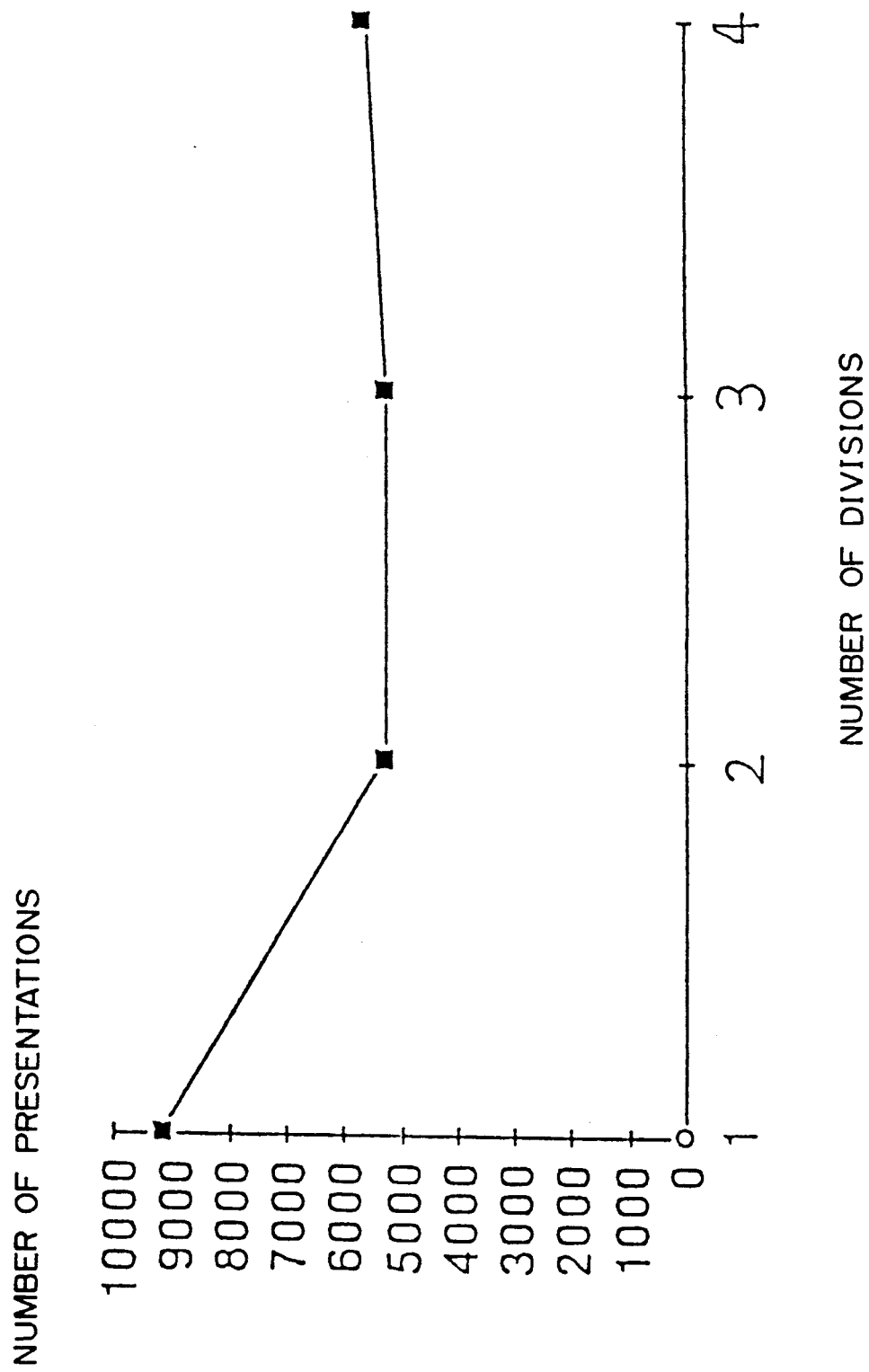

FIGS. 11A and 11B show the result of the experimentation. FIG. 11A shows the number of learning pattern presentations presented before the learning of the weight value is completed and the total number of calculations required before completing the learning of the weight value, thereby providing the experimentation result. The value of the learning constant $\delta$ of the learning parameter is set to "0.2" and the momentum $\zeta$ of the learning parameter is set to "0.4".

The learning convergence is judged as being completed when the difference between the output signal and the teacher signal in respective units is less than 0.5. In FIG. 11A, "1 division" shows the data obtained in the conventional presentation in which division is not conducted. "Seed" is for producing a random number. The initial weight value for the first-presented learning pattern set is set to a random value (the number randomly produced from $[-0.1, 0.1]$). The experimentation is performed to observe the influence of the difference caused by the manner in which the random value is produced. Accordingly, if, with the same seed, the structure of the layered network upon starting the learning process is made the same. In order to accurately observe the effect of a division of the learning pattern, it is necessary to compare the number of presentations and the total calculation amount.

The amount of calculation necessary to complete the learning is the number of instructions carried out by a computer when a neural network is realized by a software on a Neuman type computer, and is proportional to the actual calculation period. The number of presentations before completion of the learning is proportional to the calculation time when the neural network is realized by the hardware. In both cases, the amount of the calculation before completion of the learning can be calculated based on the calculation amount required for one learning multiplied by the number of learnings.

FIG. 11B shows a plot of the average value of data shown in FIG. 11A. The horizontal axis shows the number of divisions and the vertical axis shows the number of presentations. As is clear from FIG. 11B, the number of presentations of the learning pattern required before a completion of the learning of the weight value in the present invention is much less than in the conventional technology. Therefore, the learning of the weight value can be completed much more quickly than in the conventional technology.

As described above, in the present invention, the learning proceeds in accordance with a presentation of a learning pattern set comprising a small number of learning patterns. Furthermore, the weight value, which is subjected to a convergence for the presentation of the learning pattern, can be obtained in an extremely small number of calculation steps. As the value of the weight which converges for the presentation of the learning pattern to correct error has become near the converged value, the converged value of the weight can be obtained in an extremely small number of calculation steps. Therefore, the present invention greatly decreases the time necessary for learning the weight value.

Even if an unexpected new learning pattern is found, the current weight value obtained up to this point is used as an initial value to perform a similar presentation process, thereby carrying out the learning. Therefore, the present invention can learn the weight value desired for a learning pattern, including such a new learning pattern, much more quickly than in the conventional method. Japanese application No. sho 63-227825 filed on Sep. 12, 1988 entitled "A Learning Process Method of the Network Structure Data Process Apparatus" discloses an improvement in the back propagation method to speed-up the process of learning the weight value. However, the invention disclosed in this application does not calculate the updating quantum of the weight value in accordance with equations (19) and (20), but in accordance with the following equations.

$$\Delta W_{ji}(t) = -\epsilon \frac{E(t)}{W_{ji}(t)} + \zeta \Delta W_{ji}(t-1) - \eta \Delta W_{ji}(t-2)$$

$$\Delta W_{ih}(t) = -\epsilon \frac{E(t)}{W_{ih}(t)} + \zeta \Delta W_{ih}(t-1) - \eta \Delta W_{ih}(t-2)$$

$\eta$ is a learning parameter as $\epsilon$ and $\zeta$ are.

The present invention can be automatically applied to the back propagation method proposed in the above application. If the present invention is applied to the invention disclosed in the application, the learning process of the weight can be further shortened.

Figure 12:
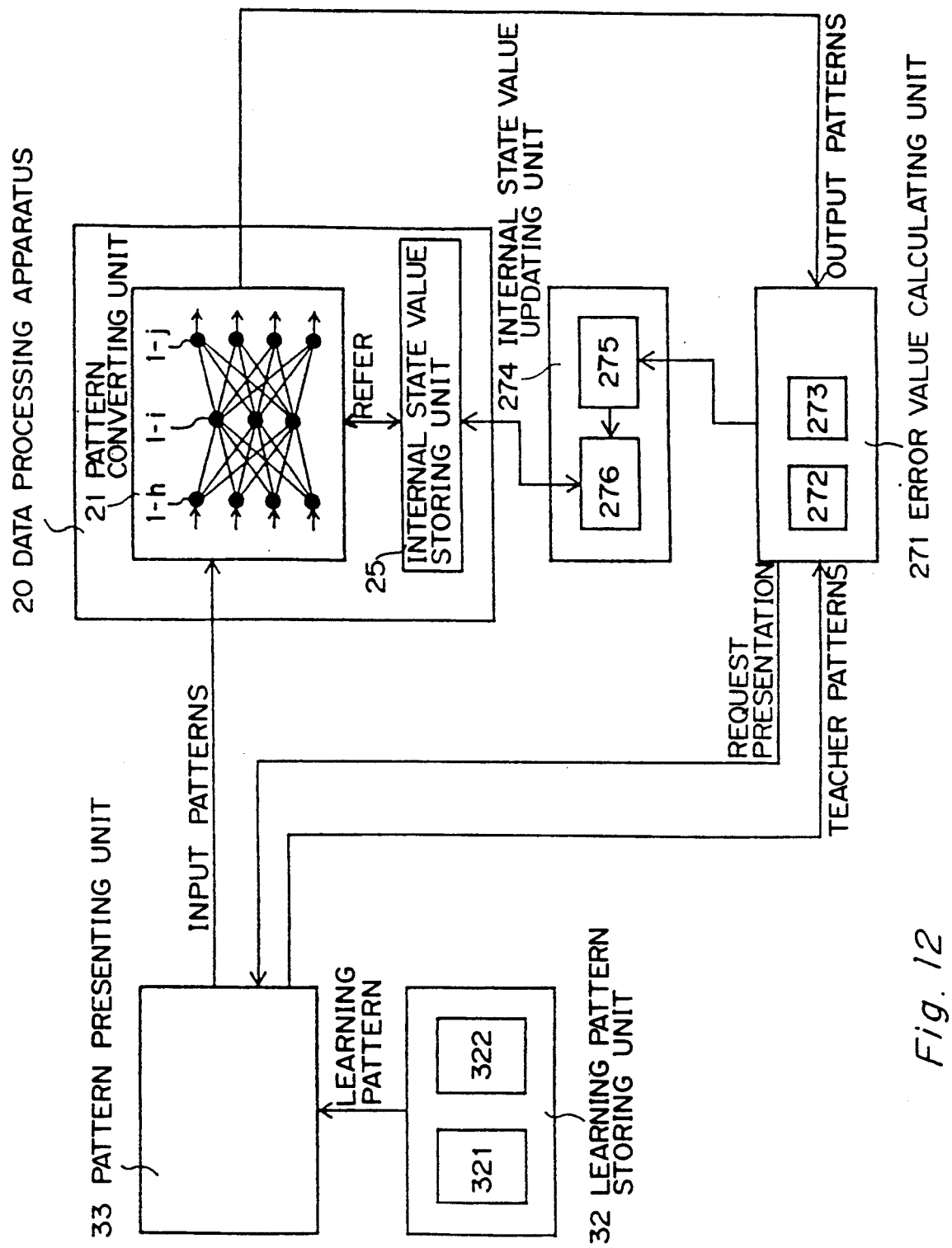
FIG. 12 is a drawing for explaining the principle of another embodiment of the present invention.

FIG. 12 shows a principle structure of another embodiment of the present invention. The same parts as in the embodiment shown in FIG. 4 are designated by the same reference numbers and their explanation is omitted. The error value calculating unit 271 calculates the error value representing the amplitude of non-coincidence between an output pattern group outputted from pattern converting unit 21 in accordance with the presentation of the input pattern group and the teacher pattern group presented by pattern presentation unit 33. Convergence judgement unit 272 is provided with error value calculating unit 271 and judges whether or not the output pattern for respective presented input patterns converge into the corresponding teacher pattern. Convergence pattern excluding unit 273, provided with error value calculating unit 271, excludes the value relating to one or a plurality of converged output patterns upon calculating a process of updating the internal state value when the establishment of the conversion is judged by conversion judgement unit 272.

An internal state value renewing unit 274 updates an internal state value stored in internal state value storing unit 25 in synchronization with the updating cycle. An updating quantity calculating unit 275 is provided in the internal state value updating unit 274 and this unit calculates the updating quantity of the internal state value necessary for determining the internal state value in the following updating cycle based on the error values calculated by the error calculating unit 271. An updating value calculating unit 276 is provided by the internal state value updating unit 274 and this unit calculates the internal state values used by the following updating cycle in accordance with the updating quantity calculated by updating quantity calculating unit 275.

The present embodiment receives a request for a presentation of a learning pattern group from error value calculating unit 271. Then pattern presentation unit 33 sequentially presents respective input patterns of the input pattern group to pattern converting unit 21 and sequentially presents respective teacher patterns of the teacher pattern group to error value calculating unit 271. When the input pattern is presented, pattern converting unit 21 refers to the internal state value of internal state value storing unit 25, and calculates and outputs the output pattern with each input pattern.

Error value calculating unit 271, as described above, receives an output pattern for the presented input pattern and the corresponding teacher pattern. It then calculates the individual error values represented by the amplitude of the inconsistency between the output pattern and the teacher pattern, for the presented input pattern group. Error value calculating unit 271 judges whether or not the error value, or another value relating to it, is within a predetermined range. If it is, the internal state value currently being learnt is converged and the learning process is thereby completed. If it is not, the internal state value updating unit 274 is activated.

During operation of internal state value updating unit 274, convergence judgement unit 272 judges in accordance with the amplitude of the calculated individual error values, or another value related thereto, whether or not respective input patterns converge to the teacher pattern. Convergence pattern excluding unit 273 prevents the value relating to the converged output pattern from being used for updating the internal state value during the process of updating the internal state value.

The updating quantity calculating unit 275 of the internal state value updating unit 274 activated as recited above calculates the updating quantity of the internal state value using an error value comprising individual error values of the non-converged output pattern. Update value calculating unit 276 obtains the internal state value to be used for the start of the next cycle, in accordance with the calculating quantum, and stores it in internal state value storing unit 25. Error value calculating unit 271 enables the same learning pattern group to be presented again for the pattern presentation, in order to realize a convergence of the internal state value. By repeating the process of updating the internal state value, the presentation process is repeated on an undesired internal state value.

The present embodiment dynamically detects whether or not respective learning patterns can be converted to the desired teacher pattern during learning and excludes those capable of outputting the desired teacher pattern from the subject of the next updating process. Therefore, the number of calculation steps required to learn the internal state value can be greatly reduced and the learning of the internal state value can be realized much more quickly than in the prior art.

Further, updating quantum calculating unit 275 of the internal state value updating unit 274 obtains the amount by which the internal state value is updated. This amount increases as the number of non converged output patterns decreases. If the updating amount of the internal state value is made large, the convergence is completed more quickly. However, if it is too large, the weight value exceeds the desired value in some learning patterns, thereby making convergence slower. In the present invention, the number of learning patterns is dynamically varied and the updated quantum of the internal state value can be made larger as operations using excessive values do not occur. Thus, the learning converges more quickly. In the above process, a learning of the internal state value can be realized within a further reduced processing time.

Further, the present embodiment does not judge convergences for all the presentations of the learning pattern group, but those for several intermittent presentations. Convergence pattern excluding unit 273 continues to execute a process of excluding the converged output pattern until the next judging cycle. Thus, convergence of the input patterns to the teacher pattern does not proceed smoothly but proceeds through a vibration process. Once convergence is established, the learning pattern is kept in the converged state. Therefore, if the learning pattern is once converged, it is considered as being kept in an almost converged state. Thus, it is deemed to remain converged for a specified minimum period of time, thereby decreasing the number of calculation steps required for the learning of the internal state value. This process can further shorten the process time for learning the internal state value.

In the above explanation, the judgement of convergence completion may be made by convergence judgement unit 272 upon one judgement of convergence completion. To increase the probability of convergence, the judgement of convergence completion can be made only when a plurality of judgements of convergence completion are made. The unit for performing the function of detecting a learning completion, as explained above by referring to error value calculating unit 271, may be provided on the side of pattern presentation unit 33. This makes it unnecessary for error value detecting unit 271 to request pattern presentation unit 33 to present the learning pattern.

Another embodiment of the present invention will now be described in detail. This embodiment is applied to a back propagation method for a data processing apparatus with a layered network structure. The structure of the learning process apparatus and the structure of the apparatus for presenting the learning pattern have been previously explained by referring to FIGS. 5 and 6. Therefore, the explanation is not repeated here.

The learning process of the present invention will be explained in more detail by referring to the flowchart in FIG. 13. When a weight value learning is requested, the initial weight value produced by the producing means, not shown, is stored in internal state value storing unit 25, as shown in step ST11. This process for initializing the weight value is carried out, utilizing a random number as an initial weight, as in the conventional manner and, for example, may be randomly selected from [−0.1, 0.1].

The initial weight value is chosen randomly because, when a special weight value is provided, for example, when all the weight values are the same, the variation of the weight value is not caused by the back propagation method. This inhibits the progress of the learning, and should thus be avoided.

At step ST12, pattern representing unit 33 selects one learning pattern (a pair comprising an input pattern and a teacher pattern) from a plurality of learning patterns stored in learning pattern storing unit 32 in accordance with the pattern presentation instruction from pattern presentation control unit 34, reads it out, and presents the read out learning pattern as the input pattern to the layered network unit 21a, thereby presenting the teacher pattern to the internal state value changing unit 26. Upon receipt of the presentation of this input pattern, layered network unit 21a outputs the corresponding output pattern in accordance with the data conversion function of the layered network at step ST13. During step ST13, "$y_{pj}$" of the output from respective basic unit j constituting the output layer explained by referring to the back propagation system can be obtained. At step ST13, the output "$y_{ph}$" of an h layer (input layer) corresponding to the outputted in accordance with the input of the selected input pattern and the output "$y_{pi}$" from the i layer (hidden layer) are simultaneously obtained.

As described above, when the output pattern "$y_{pj}$" of the conversion output of the input pattern is obtained, internal-state value changing unit 26 obtains the error $_{pj}$ between "$y_{pj}$" and the teacher pattern, which is expected to be outputted. If, at step ST14, the teacher signal to the jth unit of the the j layer corresponding to the input pattern of the p-th pattern is represented by "$d_{pj}$", the following equation is calculated.

$$y_{pj} - d_{pj} = \delta_{pj}$$

When the individual error $\delta_{pj}$" of the presented learning pattern is calculated, internal state value changing unit 26 judges from the value of "$\delta_{pj}$" at step ST15, whether or not the output pattern is converged to the teacher pattern. This judgement is conducted by comparing the value "$\delta_{pj}$" with the predetermined judgement value "k" and the convergence is determined when the value "$\delta_{pj}$" is less than the judgement value "k" for all the units, or when Ep obtained in accordance with equation (7)

$$E_p = \frac{1}{2} \sum_j (\delta_{pj})^2$$

is less than a predetermined judgement value.

When the output pattern is judged as being not converged, the process proceeds to step ST16. Internal state value changing unit 26 then provides the following equation derived from equation (11) by using "$\delta_{pj}$" obtained at step ST14 and "$y_{ph}$", "$y_{pi}$" and "$y_{pj}$" obtained at step ST13.

$$\frac{\partial E_p}{\partial W_{ji}} = \delta_{pj} y_{pj} (1 - y_{pj}) y_{pi}$$

The following equation, derived from equation (14), is also provided.

$$\frac{\partial E_p}{\partial W_{ih}} = \left( \sum_j \delta_{pj} y_{pj} (1 - y_{pj}) W_{ji} \right) y_{pi} (1 - y_{pi}) y_{ph}$$

On the other hand, when the output pattern is judged to be converged at step ST15, the process proceeds to step ST17 and immediately internal state value changing unit 26 determines the following equations.

$$\frac{\partial E_p}{\partial W_{ji}} = 0, \quad \frac{\partial E_p}{\partial W_{ih}} = 0$$

That is, when a convergence judgement is made, the calculation process according to this equation is not performed and instead "0" is set. Setting "0" in internal state value changing unit 26 means that the value relating to the output pattern is not used in the process of updating the weight value when the process is carried out thereafter. Accordingly, the learning pattern related to the output pattern is treated as being substantially not presented.

Pattern presenting unit 33 carries out the above steps ST13, ST14, ST15 and ST16, or steps ST13, ST14, ST15 and ST17, for the pattern subjected to convergence, in accordance with the pattern presentation order from pattern presentation controlling unit 34, for all the learning patterns. Thus, the presentation process of step ST12 is conducted repeatedly. When the process at step ST12 is completed, internal state value changing unit 26 proceeds to step ST18 and carries out steps ST19, ST20 and ST21, described below, in order to update the weight value beginning with the initial value.

At step ST19, the following equation is derived from equation (15) using the value obtained in step ST16.

$$\frac{\partial E}{\partial W_{ji}} = \sum_p \frac{\partial E_p}{\partial W_{ji}}$$

The following equation is also derived from equation (16).

$$\frac{\partial E}{\partial W_{ih}} = \sum_p \frac{\partial E_p}{\partial W_{ih}}$$

In step ST20, the updated quantities $\Delta W_{ji}(t)$ and $\Delta W_{ih}(t)$ of the weight value for decreasing the sum "E" of the error vector is obtained in accordance with the following equations.

$$\Delta W_{ji}(t) = -\epsilon \frac{\partial E(t)}{\partial W_{ji}(t)} + \zeta \Delta W_{ji}(t-1)$$

$$\Delta W_{ih}(t) = -\epsilon \frac{\partial E(t)}{\partial W_{ih}(t)} + \zeta \Delta W_{ih}(t-1)$$

The updated quantities $\Delta W_{ji}(t)$ and $\Delta W_{ih}(t)$ of the weight value are also obtained in step ST20. The new weight value is then obtained in step ST21 in accordance with the following equations.

$$W_{ji}(t) = W_{ji}(t-1) + \Delta W_{ji}(t)$$

$$W_{ih}(t) = W_{ih}(t-1) + \Delta W_{ih}(t)$$

The weight value thus obtained is utilized in the next updating cycle in the internal state value storing unit 25.

Learning convergence judgement unit 36 (FIG. 6) receives the teacher pattern from pattern presentation unit 33 during the presentation process for the learning pattern at step ST12 and the output pattern from layer network unit 21a and calculates "$\delta_{pj}$" in the same manner as in internal state value changing unit 26. Upon a completion of the presentation process for all the learning patterns, it is judged in step ST22 whether or not the weight value learning process is completed. This judgement is carried out by determining the completion of the learning when the value "$\delta_{pj}$" relating to all the learning patterns is compared with the predetermined judgement value "h" and is found to be less than this value "h" or by determining a completion of convergence when E, calculated from the following equation $$E = \sum_p E_p = \frac{1}{2} \sum_p \sum_j (\delta_{pj})^2$$

and obtained in accordance with the equation (8), is less than the predetermined judgement value "h". The judgement value "h" obtained in this process is not always the same as the judgement value "k" obtained in step ST15. If h>k, the judgement of whether or not the pattern can be used as an effective learning pattern can be made more strictly than in the judgement of a learning completion.

Upon judging completion of the learning at step ST22, namely, upon obtaining the weight values in which the output patterns relating to all the provided input patterns can be outputted as the corresponding teacher patterns, the learning process is completed. Conversely, when it is judged that the learning is not completed, learning convergence judgement unit 36 notifies pattern presentation control unit 34 of incompletion of the learning. When pattern presentation control unit 34 receives this notification, it transmits the pattern presentation order to pattern presentation unit 33 to repeat the process at step ST12 by continuing the updating process in accordance with the pattern presentation order. A weight value capable of outputting the desired teacher pattern is learnt.

The present invention newly provides the process of step ST15 and dynamically detects the learning pattern which is converged during learning. It does not use the detected converged learning pattern as the learning pattern substantially, as shown in a process in newly provided step ST17, which decreases the calculation quantity of the learning process and shortens the learning period.

Figure 13:
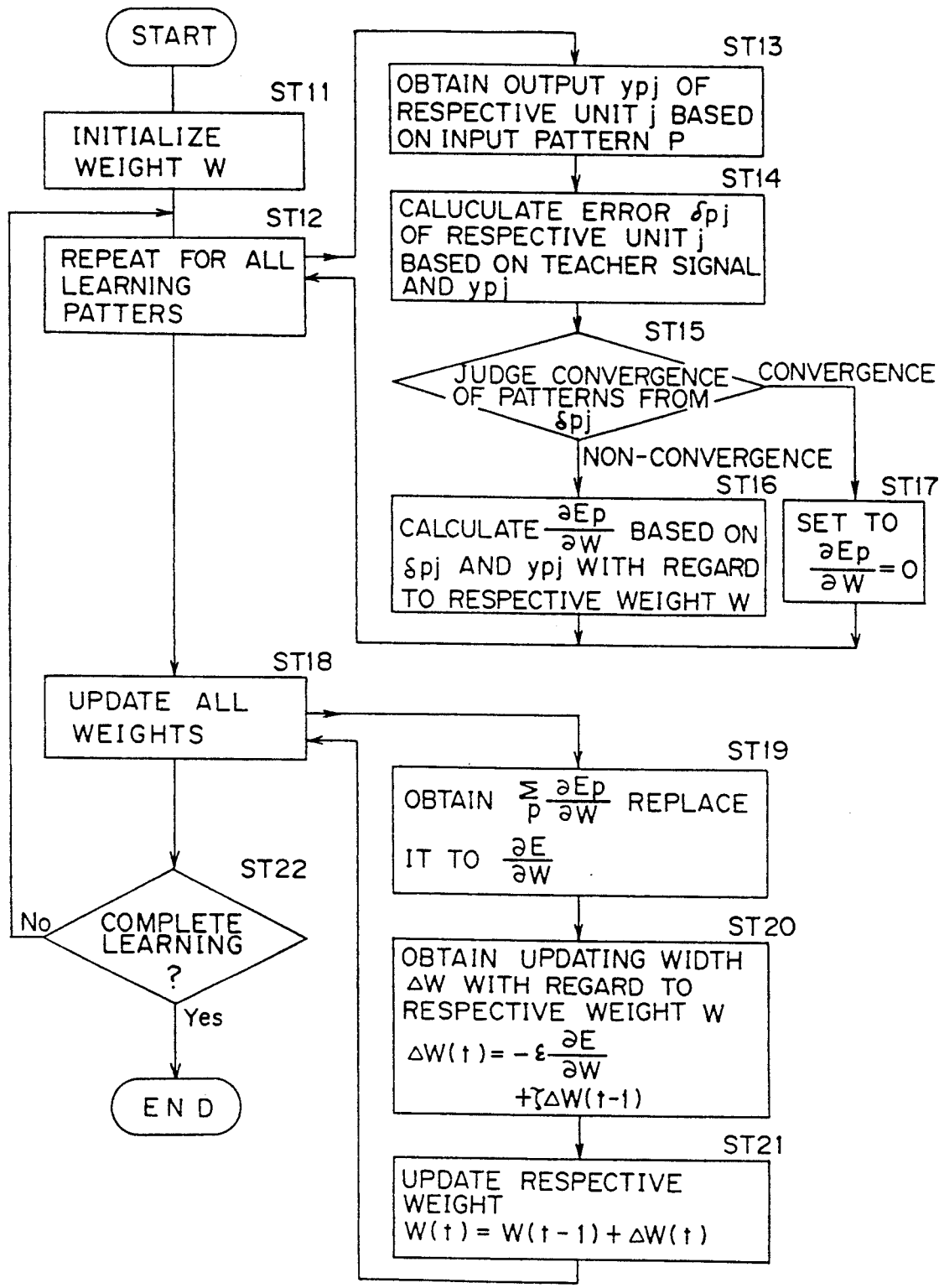
FIG. 13 shows a flowchart for explaining the operation of another embodiment of the present invention.

In the flowchart shown in FIG. 13, the process at step ST15 is conducted for every presentation of the learning pattern. It judges whether the output pattern converges to the teacher pattern and determines whether the output pattern should be used for the learning pattern for the next updating cycle. To shorten the learning time, the convergence judgement can be made every several presentations or intermittently. Thus, the learning pattern, which is judged as being converged at a point very close to the judgement value "k", is deemed to be kept being converged until the next judgement cycle, thereby decreasing the number of calculation steps. Even if such treatment is conducted, the learning pattern is almost converged and no error is caused in the learning process.

Further, in the flowchart shown in FIG. 13, the updating quantity of the weight value is used as the back propagation method. The improvement of the back propagation method recited in the above described application of the Japanese patent application no. 63-2278225 can also be applied to provide an updated amount as described above.

In the flowchart shown in FIG. 13, the process enters step ST17 as a result of only one convergence judgement. Thus, it may be preferable to increase the probability of convergence judgement to get into step ST17 when a plurality of continuous judgements is made for convergence.

It is possible to combine the above-recited embodiment with the first embodiment shown in FIG. 4. As described above, in the first embodiment, the learning pattern group is divided into a plurality of sets which are sequentially represented. Before presenting respective added learning patterns, the learning patterns belonging to all the learning pattern sets presented up to this point are presented. Finally, the learning patterns belonging to all the sets are presented. In the process of updating internal state values in accordance with these presentations, the value obtained in accordance with the previously presented learning pattern group is used as an initial value of the internal state value.

Next, experimental data representing the advantage of the present invention will be explained.

Figure 14B:
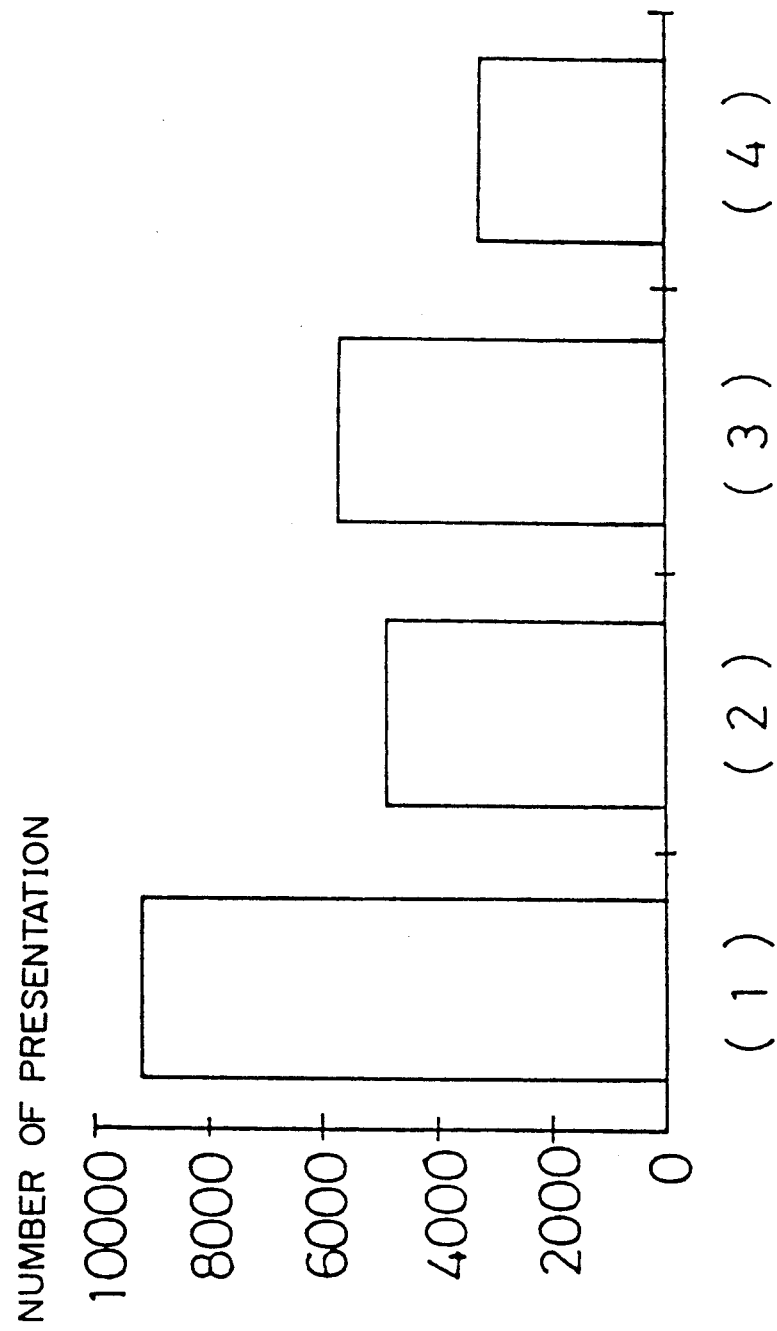

FIGS. 14A and 14B show experimental data of the present embodiment. The experimentation is performed by comparing the number of weight value learnings in which a recognition or identification of 26 Roman characters, each comprising 8×8 dot as in the previous embodiment is conducted. FIG. 14A shows the data of the experimental results, including the number of learning pattern presentations performed before completion of the learning of the weight value, and the total calculation quantity required to complete the learning of the weight values. In FIG. 14B, the average value of the data shown in FIG. 14A is plotted. (1) to (4), along the horizontal axis, represent the experimentation items and the vertical axis represents the number of presentations. The experimentation condition is the same as for the experimental data shown in FIGS. 11A to 11B.

The experimental data of experimental item (1) in FIG. 14A are obtained when 26 Roman characters are presented without being subjected to any division. Those of item (2) are obtained by applying the present embodiment to the presentation method which does not use the division. Those of item (3) of FIG. 14A are obtained when 26 Roman characters are divided into 4 sets, as shown in FIGS. 11A and 11B. Those of item (4) are obtained by applying the present embodiment to respective learning pattern sets presented in accordance with the presentation method of the 4 divisions. Therefore, in order to understand the effect of only the second embodiment, the data of item (1) are compared with those of item (2) and data of item (3) should be compared with those of item (4).

As is clear from the graph in FIG. 14B, the present embodiment enables the number of presentations of the learning pattern and the total number of calculations required before completion of the learning of the weight value to be much smaller than in the prior art method, thereby completing the learning of the weight data much more quickly than in the prior art method. If the present embodiment is combined with the previous embodiment, it is confirmed that the learning of the weight value can be completed even more quickly.

In order to increase the learning speed of the back propagation method, it may be necessary to determine a large learning constant $\epsilon$ of the learning parameter and provide a large updated quantity of the weight value. However, if the learning constant $\epsilon$ is made too large, then the process passes the appropriate converged state depending on the learning pattern, thus resulting in a slow learning speed. Therefore, in the prior art, an experimentally obtained constant value, determined as "2" in the above experiment, is used as learning constant $\epsilon$. However, the present embodiment dynamically changes the number of effective learning patterns, thus decreasing the effect of such passing processes in accordance with the progress of the learning. Therefore, when the present embodiment is employed, a larger learning constant e is used in accordance with the smaller number of the learning patterns subjected to back propagation, (namely, the smaller number of the learning patterns which are judged as nonconvergent by a process at step ST15 in the flowchart shown in FIG. 13). Therefore, the learning speed is expected to be further increased.

FIGS. 15A and 15B show experimental data is obtained by an experiment conducted to determine whether or not the structure shown in the above embodiment is advantageous. This experiment is conducted for the presentation method of the learning pattern for experiment item (4) of the experiment shown in FIGS. 14A and B. FIG. 15A shows data including the number of presentations of the learning pattern required to complete the learning of the weight value and the experimental result data including the total calculation amount required to complete the learning of the weight value. FIG. 15B plots average values of the data shown in FIG. 15A. In FIG. 15B, the horizontal axis of items (5) and (6) represents the experimental item and the vertical axis represents the total calculation amount and the number of presentations.

The experimental data of experimental item (5) shown in FIG. 15A are obtained where the learning constant $\epsilon$ is determined in inverse proportion to the number of the back propagated learning pattern ($\epsilon = 5.2$/the pattern number). The experimental data of experimental item (6) is obtained when the learning constant $\epsilon$ is fixed at a constant value of "0.2". As is clear from the graph shown in FIG. 15B, the learning constant $\epsilon$ is made larger in accordance with the smaller number of back propagated learning patterns. This relationship between the learning constant $\epsilon$ and the number of the learning patterns is not always in inverse proportion. Therefore, it is certain that the learning of the weight value can be carried out much more quickly.

Figure 1:
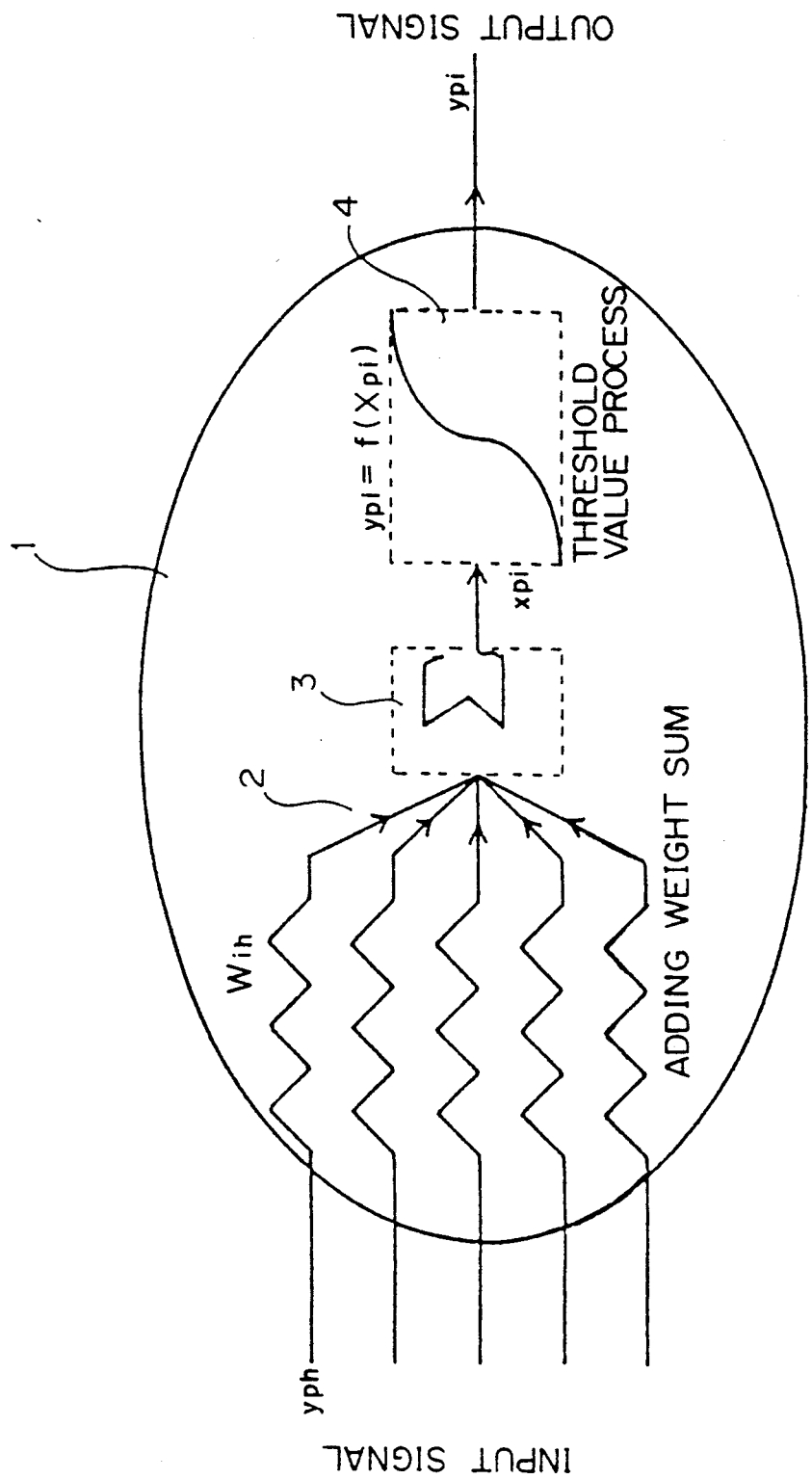
FIG. 1 is a drawing for explaining the principle of the basic unit.
Figure 16:
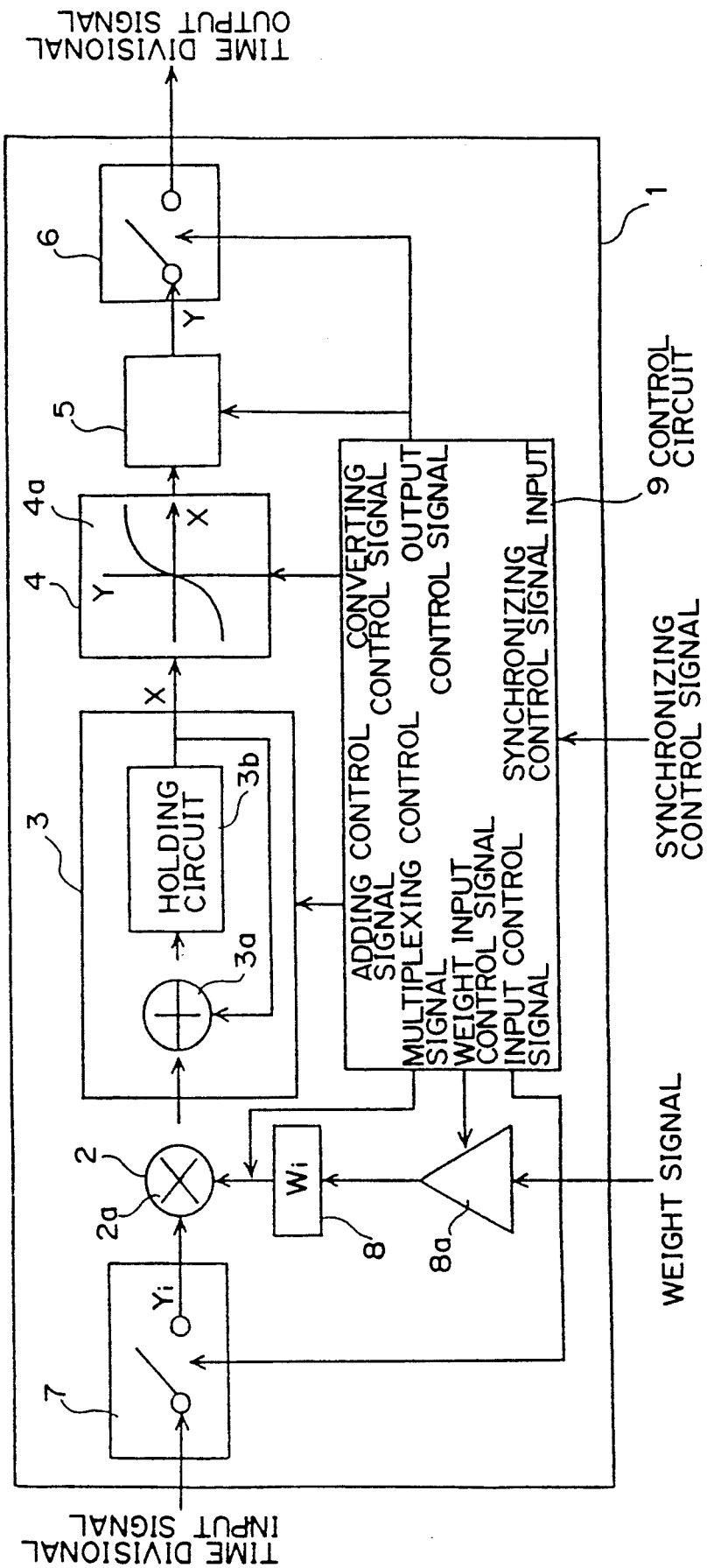
FIG. 16 shows a block diagram of a basic unit used in the embodiment of the present invention.

The content of the network structure data processing apparatus, carried out using the weight data determined as described above, is explained in detail by referring to the following embodiment. FIG. 16 shows the structure of the basic unit shown in FIG. 1. Multiplication processing unit 2 comprises multiplication type D/A converter 2a which multiplies an analog signal (inputted through input switch unit 7) from the basic unit 1 of the previous layer or the later described initial signal outputting circuit 13 by weight information (inputted through weight holding unit 8) from the digital signal to be multiplied by the input, thereby outputting the multiplied result as an analog signal. Accumulation processing unit 3 comprises analog adder 3a, which is composed of an integrator, and sample hold circuit (holding circuit) 3b for maintaining the addition result of the analog adder 3a. Analog adder 3a adds the previously obtained output of multiplying type D/A converter 2a to the added value maintained in sampling hold 3b, thereby providing a new added value. Sampling hold circuit 3b holds the added value obtained by analog adder 3a and feeds back the held value to analog adder 3a as the previous added value. These adding processes are carried out in synchronization with an adding control signal outputted from control circuit 9. Threshold process unit 4 comprises non-linear-type function generating circuit 4a of an analog function generating circuit. It outputs a non-linear type signal, such as a sigmoid function, in response to the input and applies an arithmetic calculation process to the added value X held in sample hold circuit 3b, thereby providing analog output value Y, when the multiplication of the analog signal inputted through input switch unit 7 by multiplying type D/A converter 2a and an accumulation of the multiplication result are completed. Output maintaining unit 5 comprises sample hold circuit 3b and holds the output value Y of the analog signal from non-linear type function generating circuit 4a, which becomes the output to the basic unit 1 of the following stage layer.

Output switch unit 6 is turned ON by control circuit 9 for a predetermined period upon receiving the output control signal and outputs the final output to maintain output holding unit 5 on the analog bus. The input switch unit 7 is turned ON to receive the final output from basic unit 1 at the previous stage and to receive the analog output from initial signal output circuit 13 when the input control signal is received from control circuit 9, and provides the analog value to multiplying type D/A converter 2a. Weight holding unit 8 comprises, for example, a parallel out shift register, and maintains the weight signal transmitted from later described main control circuit 60 as a weight necessary for multiplying process unit 2 when the gate of tri-state buffer 8a is made open, that is, when the weight input control signal is turned ON by control circuit 9. Control circuit 9 controls the process function of basic unit 1.

The arithmetic operation executed by multiplying processing unit 2, accumulating processing unit 3 and threshold value processing unit 4 is as follows. As described above, when a plurality of inputs connected to basic unit G are Yi, the weight corresponding these connections is Wi. Thus, the multiplying processing unit 2 calculates the following.

$$Y_i \cdot W_i$$

Accumulating processing unit 3 calculates the following equation.

$$X = \Sigma Y_i \cdot W_i$$

When the final output is Y, threshold processing unit 4 calculates the following equation.

$$Y = 1/(1 + exp(-X+\theta))$$

As constructed above, the input and output of basic unit 1 employing the signal process structure shown in FIG. 16 is realized by the analog signal.

Multiplying type D/A converter 2a may be constructed such that it receives the weight information of the digital signal in parallel or the weight information may be received sequentially and converted into a parallel signal. If the weight information is constructed by the analog signal, the analog multiplier may be used instead of multiplying type D/A converter.

Figure 2:
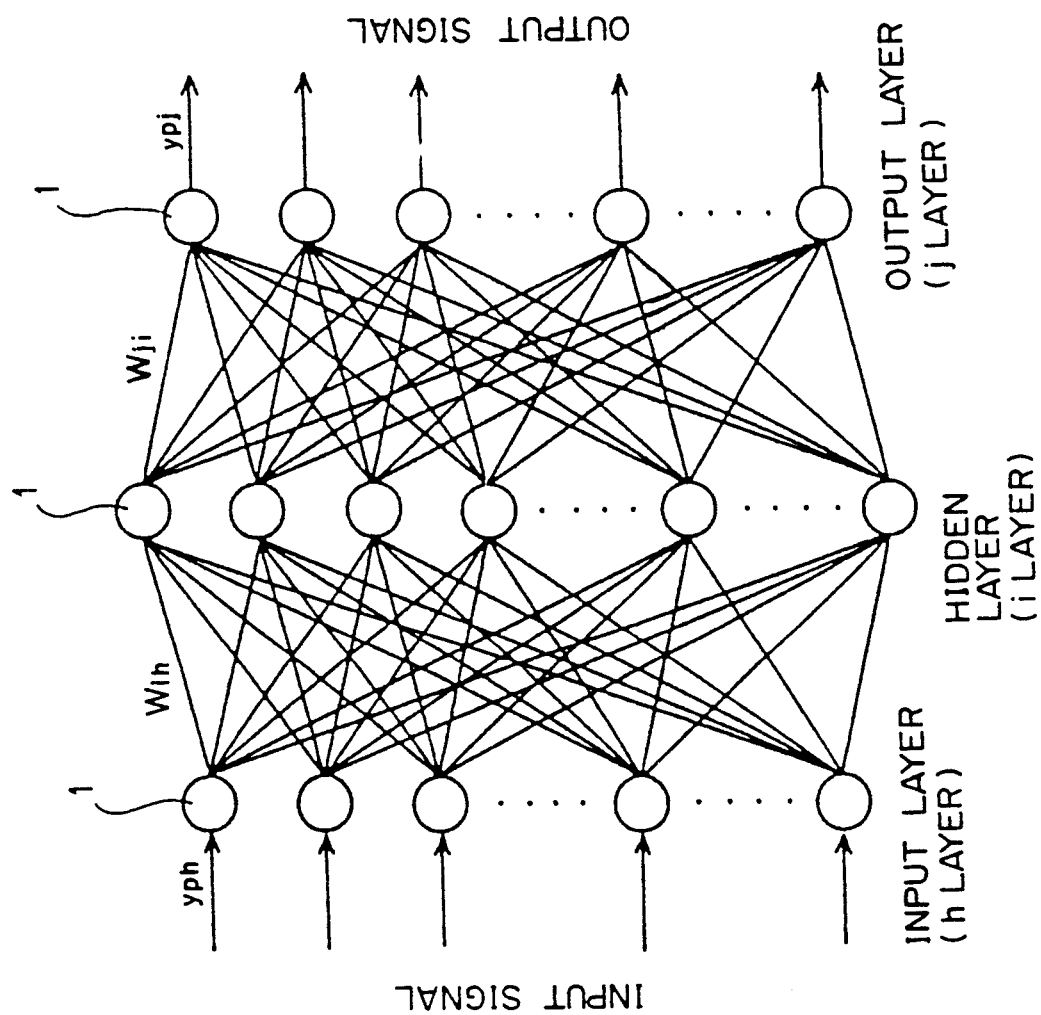
FIG. 2 is a drawing for explaining the principle of a layered network system.
Figure 17:
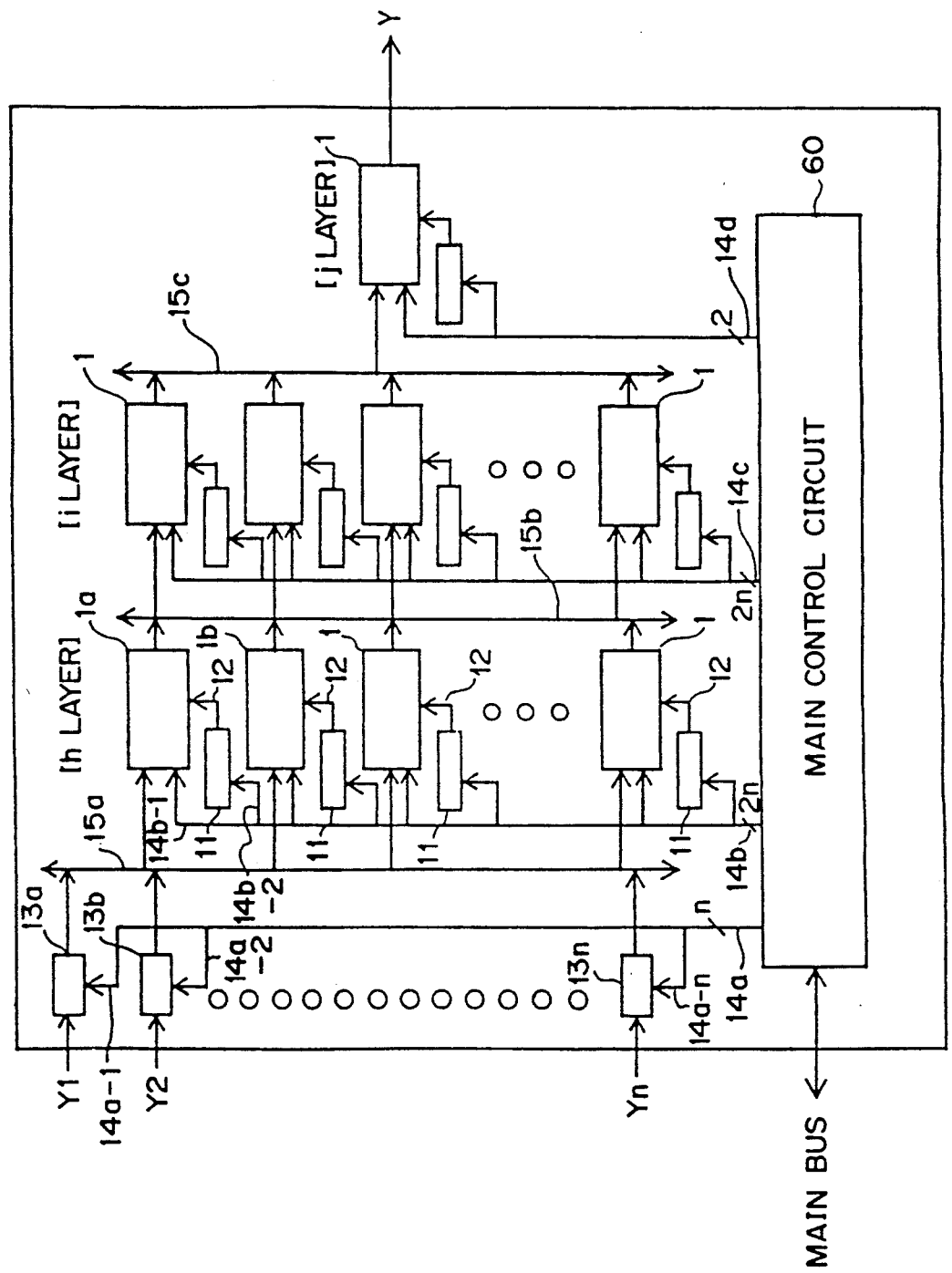
FIG. 17 shows a block diagram of the network structure data processing apparatus according to the present invention.

FIG. 17 shows the structure of the embodiment of the layer network shown in FIG. 3. In this embodiment, the electrical connection between the layer structure of the layer network is realized by a single common analog bus 15 (a to c may be attached to the analog bus 15 as an identifier). Accordingly, the final value outputted from the output switch unit 6 of basic unit 1 is constructed such that it is outputted in the output mode of the analog signal, while the final output value is inputted to basic unit 1 located in the following stage layer. This embodiment discloses a layer network of a three layered structure. The input layer is designated by h, the hidden layer by i, and the output layer by j, as shown in FIG. 2.

The weight output circuit 11 is provided for respective basic units 1 and outputs the weight for weight holding unit a of basic unit 1. Weight line signal 12 connects the output of weight output circuit 11 through weight holding unit 8, provides initial signal output circuit 13 (a to n may be attached to the initial signal output circuit as an identifier) in accordance with the number of dimension input patterns, and outputs an initial signal to an input layer of a layer network as an input pattern. Synchronizing control signal line 14 (a to d may be attached to the synchronizing control signal line as an identifier) transfers the synchronizing control signal from main control circuit 60 carrying out the control of the data transfer to weight output circuit 11, initial signal output circuit 13 and control circuit 9 of the basic unit 1. Synchronization control signal line 14 is designated by a common line in the drawing but is connected to respective circuits from main control circuit 60 as individual signal lines.

Figure 18:
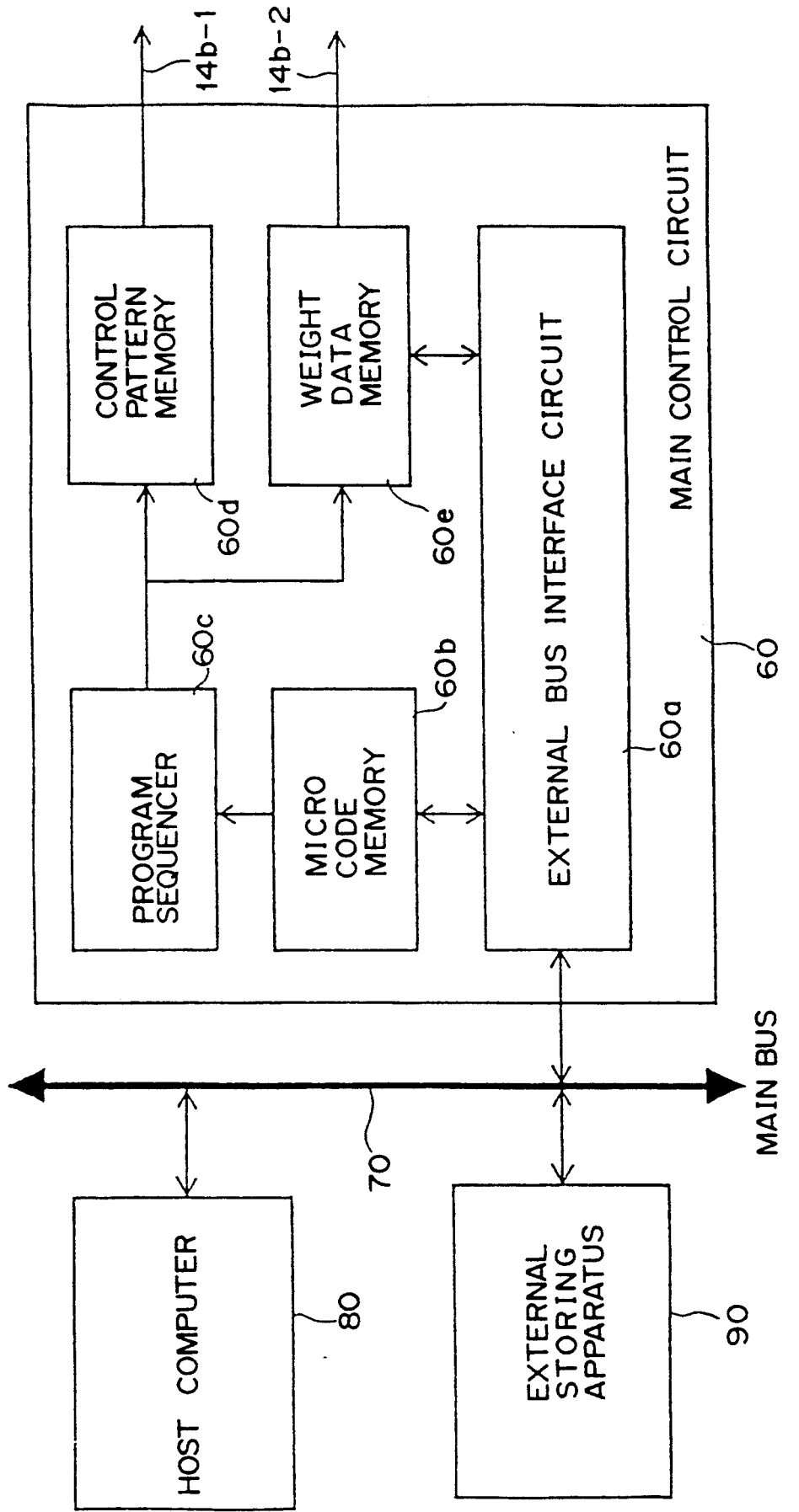
FIG. 18 shows the structure of a main control circuit used in the embodiment shown in FIG. 17, FIGS. 19(1)–19A(8) and 19B are timing charts for processing a signal in the embodiment shown in FIG. 17, and FIGS. 20(a)–20(hn) are a timing chart of a signal processing in the basic unit used in the present invention.

FIG. 18 shows in detail the system of main control circuit 60.

Main control circuit 60 comprises external bus interface circuit 60a, micro code memory 60b, program sequence 60c, control pattern memory 60d and weight data memory 60e. External interface circuit 60a is connected to post computer 80 and external memory apparatus 90 through main bus 70 and receives an operation instruction from host computer 80. Micro code memory 60b stores a micro-code for defining operation of program sequencer 60c. Program sequencer 60c controls control pattern memory 60d and weight data memory 60e in accordance with a micro code within micro code memory 60b. Control pattern memory 60d has output signal lines connected to initial signal output circuit 13 and basic unit 1 in an initial layer, an hidden layer and an output layer, individually. It turns the output signal lines on or off to select each of respective sets, that is, respective sets of initial signal output circuit 13, input layers, hidden layers, and output layers or basic units 1 in a time divisional manner, in accordance with an instruction from program sequencer 60c. Weight data memory 60e provides respective basic unit 1 with weight in synchronization with the time divisional input signal in accordance with the instruction from program sequencer 60c, thereby providing the weight for digital data to respective weight output circuit 11. Host computer 80 provides initial output circuit 13 with the input YI.

The operation of the embodiment shown in FIG. 17 is next explained, with reference to the timing chart shown in FIG. 19.

When a request for conversion to an output pattern is provided by host computer 80 through main bus 70, main control circuit 60 transmits an output control signal sequentially and cyclically to an initial signal output circuit 13 and selects a plurality of initial signal output circuits 13 sequentially and cyclically. Namely, main control circuit 60 simultaneously provides a synchronization control signal to the basic unit in the input layer from control pattern memory 60d in accordance with an instruction of program sequencer 60c and sequentially turns synchronization control signal lines 14a for respective initial signal output circuits 13. Namely, main control circuit 60 turns on only synchronization control signal line 14a (shown by 14a-1 in the drawing) to open a gate of initial signal output circuit 13a, in order to output input pattern Y1 supplied to initial signal output circuit 13a to analog bus and turns off other synchronization control signal 14a. Next, main control circuit 60 turns on synchronization control signal 14a (shown 14a-2) to open a gate of initial signal output circuit 13b, in order to output an input pattern Y2 to initial signal output circuit 13b to analog bus 15 and turns off other synchronization control signal lines 14a. The following operation is conducted as recited above. Main control cicuit 60 performs an ON and OFF operation on synchronization control YN of initial signal output circuit 13n is outputted to analog buses 15. Main control circuit 60 simultaneously sets the outputs of weight data memory 60e for respective weight output circuits 11 through synchronization control signal line 14b in synchronization with ON operations of respective synchronization control signal lines 14a in order to provide weight to respective weight output circuits 11 of respective basic units 1 in the input layer.

In FIG. 19A, a synchronization control signal of synchronization control signal line 14a is represented by Yi output control signal (i=1 to n) and initial signal output circuit 13a is sequentially and cyclicaly selected. n designates the number of initial signal output circuit 13. The initial signal output circuit 13, as selected above, transmits an analog signal YI provided as an input pattern to an analog bus 15 (presented by an input layer analog bus 15a in the drawing) provided between the input layer and the initial signal output circuit 13a. This input pattern is given through host computer 80. Accordingly, an analog signal Yi is sequentially transmitted on the input layer analog bus 15a sequentially. The number of the analog signal YI corresponds to that of initial signal output circuit 13. Initial input pattern Yi, and following input patterns Yi are transmitted one after another repeatedly.

Multiplication process unit 2 of respective basic units 1 in an input layer receives the transmitted analog signal YI transmitted and uses a weight WI of weight holding unit 8 set by main control circuit 60 to carry out an arithmetic operation (YI.WI) The weight WI is designated by respective connections between initial signal output circuit 13 and basic unit 1 in the input layer in accordance with the learning method of the present invention.

Accordingly, main control circuit 60, as shown in FIG. 19B, sets a weight Wi corresponding to selected initial signal output circuit 13 into weight holding unit 8 in respective basic units 1 of an input layer through weight output circuit 11 in synchronization with a selection process of initial signal output circuit 13. It is possible to set a weight in basic unit 1 in accordance with any mode of an analog signal or digital signal. The weight is designated by respective connections and as stated above, should be expressed accurately by $W_{ij}$ (j indicates the number of the basic unit in the input layer) but is represented by WI to simplify the explanation.

The processing operation is explained by referring to the timing chart shown in FIG. 20, for a signal processing of a basic unit 1. Basic unit 1 (represented by 1a in the drawing) in the input layer is explained.

When control circuit 9 receives a synchronization control signal from control pattern memory 60j of main control circuit 60 through synchronization control signal line 14b (represented by 14b-1 in the drawing) and then turns input control signal (c) ON at the same time input switch unit 11 is made conductive, control signal 9 turns ON weight input control signal (d) opening a gate of tri-state buffer 8a and an output control signal ($h_1$) for making output switch unit 6 conductive. Then, in synchronization with a clock (a) main control circuit 60 sequentially turns the synchronization control signal line 14a ON and input pattern signal Yi maintained in initial signal output circuits 13a, 13b ... 13n is provided to amplification type D/A converter 2a through analog bus 15 and input switch unit 7.

Main control circuit 60 provides a weight of weight data memory 60e to weight output circuit 11 through synchronization control signal line 60b (represented by 14b-2 in the drawing) and this weight (digital data) I is stored in a weight holding unit 8 through tri-state buffer a. Then, the output control signal (H) is turned ON for only one period of the clock (a), the analog gate of the sample hold circuit in output maintaining unit 5 in the basic unit 1 is made in an open state for this period, and the held analog value is outputted to hidden layer analog bus 15b through output switch unit 6. The weight W1 of the digital value is stored in holding unit 8. Multiplication control signal (e) is then turned ON and multiplication type D/A converter 2a multiplies analog signal YI received through input signal unit 7 by the weight W1, thereby outputting the multiplication result as an analog signal. Next, as the adding control signal (S) is turned OFF, an analog adding adder 3a formed by an integrator operates and an analog value (which is initially cleared to 0) maintained before in sample hold circuit 13b is added to an amplification result of defined type D/A converter 2a, thereby storing the addition result in sample hold circuit 3b again.

In accordance with the above operation, one bus cycle is completed and input pattern Y2 for initial signal output circuit 13b is provided from input switch unit 7 in synchronization with the next clock (a) and weight output circuit 11 provides weight W2 corresponding to the input pattern Y2. Thus, input pattern Y2 is multiplied by weight W2 and the multiplication result is added to the value held in sample hold circuit 33b. Then, the output control signal (h2) of basic unit 1 (represented by 1b in the drawing) is turned ON, and thereafter, this operation is repeated until the process for an input pattern Yn to the initial signal output circuit 13n is completed. When the multiplication of the input pattern Yn by Wn is completed, conversion control signal (G) is turned ON. The value obtained by accumulating the multiplication result is then inputted to non-linear type function generating circuit 4a of threshold processing unit 4 and the corresponding Y value is maintained in output holding unit 5. Therefore, the threshold processing unit 4 performs the following arithmetic operation.

$$Y = 1/(1 + exp(-X + \theta))$$

Therefore, the final output value Y, which is the final operational output of the basic unit 1, can be obtained and is maintained in holding unit 5. When this value Y is obtained, the accumulated value (the content held in sample hold circuit 3b) in accumulation processing unit 3 is in synchronization with a selection cycle of the next initial signal outputting circuit 13 and is cleared by the input synchronization control signal.

In accordance with the operation described above, respective basic units 1 provide the final output value Y from input pattern Yi and weight Wi.

Hereafter, the explanation returns to the structure of the embodiment shown in FIG. 17. As explained in detail by referring to FIG. 20, the process for inputting the pattern set in all the initial signal output circuits 13 is completed and then main control circuit 60 again provides the respective basic units 1 (a to n are added as identifiers) with synchronization control signals. Thus, a similar operation is carried out in accordance with input pattern Yi newly provided to initial signal output circuit 13 and a new weight Wi provided through main bus 70 and outer bus interface circuit 60a from host computer 80.

On the other hand, the final output value 5 of the basic unit 1 of the input layer thus obtained is set in output holding unit 5 and transmitted in a time divisional manner to basic unit 1 of the hidden layer positioned in the next state through analog bus 15 in the same manner as for initial signal output signal 13. Namely, main control circuit 60 controls output signals H1 to Hn (FIG. 20) to control circuit 9 for respective units 1a to 1n in the input layer through synchronization control signal line 14b (which is represented by 14b-1 in the drawing) sequentially and cyclically, thereby turning the output switch unit 6 of the basic unit 2 1a to 1n. Therefore, the analog signal of the final output value maintained in the output hold unit 5 of respective basic units 1a to 1n is transmitted in a time divisional manner to multiplying processing unit 2 of respective basic units 1a to 1n in the hidden layer period. Respective basic units 1a to 1n in the hidden layer carry out the same operation as described above. They use the final output value Y of basic unit 1 in the hidden layer obtained by the above process, and carry out transmission processing for basic unit 1 in the hidden layer in a similar time divisional manner, thereby dividing final output value Y of basic unit 1 in the output layer. Main control circuit 60 similarly controls respective basic units 1a to 1n through synchronization control signal lines 14c and 14d individually connected to respective basic units 1 in the output layer. FIG. 19 (a) shows a timing chart of an output control signal to basic unit 1 in the input layer in accordance with Y1 output control signal applied to initial signal output circuit 13. It also shows a timing chart of the final output value Y of the basic unit 1 in the input layer which is transmitted on analog bus 15 (expressed as the hidden layer analog bus in the drawing) provided between the input layer and an hidden layer.

The embodiment described above, can realize the data process of the network structure data process apparatus whose principle is shown in FIG. 2 by referring to weight information determined by the learning system of the present invention. Various inplementing systems can be considered for the learning system of the present invention. One, the data processing apparatus model used exclusively for setting an internal state value, is formed on a computer. The learning process algorithm is applied to the this model obtained in an internal state value and the internal state value is transferred to the actual data processing apparatus. In another inplementing system, a program of the learning process algorithm is inplemented within a computer, for example, a host computer shown in FIG. 18, provided within the actual data processing apparatus. This computer calculates the updated quantum of the internal state value by using the actual data process apparatus to obtain the new input state value. The input state value finally obtained is set as an internal state value upon carrying out the data process. The above explanation is not limited to the embodiment shown above. The present invention is not limited to the data apparatus of the layer type network and may be applied to a data process apparatus with any type of adaptability. As described above, the present invention can learn the internal state value much more quickly than the conventional system when the internal state value defines the data process function of the data adaptable process apparatus.

What is claimed is:

1. A learning system for use in a data processing apparatus for learning an input pattern by obtaining an internal-state value necessary for realizing a desired data conversion, comprising:

a pattern converting neural network having a multiplier, an accumulator and a threshold value processor for performing a pattern conversion defined by the internal-state value and for calculating an output pattern corresponding to the input pattern;

pattern presenting means, coupled to said pattern converting neural network, for inputting to the learning system an input pattern group of a subject to be learned for pattern conversion, said pattern presenting means dividing the input pattern group of the subject to be learned into a least two sets, selecting one of the divided sets, and presenting the input patterns belonging to all the sets presented up to the current point when an internal-state value to be converged is obtained in accordance with the input of said selected set;

error value calculating mans for calculating an error value representing a magnitude of an inconsistency between an output pattern outputted from said pattern presenting means in accordance with the presented patterns and a teacher pattern representing a pattern designated by said output; and an internal-state value updating means for updating an internal-state value in accordance with an updated quantity of an internal-state value calculated based on the error value and obtaining an internal-state value having an error value within a specified allowance.

2. The learning system according to claim 1, wherein said internal-state value updating means comprises:

an updating quantity calculating unit operatively connected to said error value calculating means, for calculating an updating quantity of the internal state values based on the error values calculated by said error value calculating means; and an updating value calculating unit, operatively connected to said updating quantity calculating unit and said data processing apparatus, for calculating the internal state values in accordance with the updating quantity calculated by said updating quantity calculating unit, said internal-state value updating means using an internal-state value obtained from the previously presented input pattern set as an initial value when the internal-state value is learned in accordance with said pattern presentation.

3. The learning system according to claim 1, further comprising a learning pattern storing unit, wherein when a pattern or a plurality of input patterns which are a subject of a learning are added during performance of the learning process after completion of the learning of the internal state value, said pattern presenting means presents to the pattern converting unit said added input pattern as one set for pattern conversion, thereby further learning the internal state value.

4. The learning system according to claim 1, further comprising a learning pattern storing unit, wherein when a pattern or a plurality of input patterns which are a subject of a learning are added during performance of the learning process after completion of the learning of the internal state value, said pattern presenting means presents to the pattern converting unit said added input pattern by dividing said added input patterns into a plurality of sets for pattern conversion, thereby further learning the internal state value.

5. The learning system according to claim 1, further comprising a learning pattern storing unit, wherein when a pattern or a plurality of input patterns which are a subject of a learning are added during performance of the learning process after completion of the learning of the internal state value, said pattern presenting means presents to the pattern converting unit said added input pattern by combining said added input pattern with the original input pattern for said pattern conversion so that said added input pattern and the original input pattern are divided into a plurality of input pattern sets, thereby further learning the internal state value.

6. The learning system according to claim 1, wherein said pattern conversion is conducted by a basic unit for receiving one or a plurality of inputs from a previous stage layer and an internal state value to be multiplied by said input, thereby providing the sum of the products, and for converting the sum of the products thus obtained to a final output through a threshold value function,
said learning system further comprising a layer network unit including:
  an input layer comprising a plurality of sets of basic units;
  one or more stages of hidden layers, each comprising a plurality of basic units; and
  an output layer comprising one or more of said basic units, an internal connection being formed between said input layer and said first hidden layer, between hidden layers, and between, a hidden state value being set in accordance with said internal connection, thereby forming a layered network structure.

7. A learning system for use in a data processing apparatus for learning an input pattern by obtaining an internal-state value necessary for realizing a desired data conversion, performing a pattern conversion defined by the internal-state value, and calculating an output pattern corresponding to the input pattern, said system comprising:
  an adaptable data processing apparatus including:
    an internal-state value storing unit for performing a data processing function; and
    a pattern converting neural network including a multiplier, an accumulator and a threshold value processor, operatively connected to said internal-state value storing unit and operatively connected to receive an input pattern, for converting the input pattern to an output pattern in accordance with the data processing function of said internal-state value storing unit;
  learning pattern storing means for storing groups of learning patterns necessary to learn an internal-state value, including;
    input storing means for storing a plurality of input patterns for the learning process; and
    teacher pattern storing means for storing teacher patterns provided as output patterns corresponding to the input patterns;
  a pattern presentation unit, operatively connected between said learning pattern storing unit and said adaptable data processing apparatus, for reading a group of learning patterns from said learning pattern storing means, inputting the input patterns to said pattern converting neural network, and for distributing said teacher patterns among the input patterns, including:
    presentation pattern determining means for dividing the learning pattern groups into at least two sets and determining the pattern group to be presented;
    presentation-pattern transmitting means for performing a presentation process of the learning pattern groups determined by said presentation-pattern determining means; and
    presentation-amplified pattern-management means for managing the learning pattern group;
  an error value calculating unit, operatively connected between said pattern presentation unit and said adaptable data processing apparatus, for calculating an error represented by an amplitude of a non-coincidence between the output patterns and the teacher patterns.

8. A learning system according to claim 7, further comprising an internal-state value updating unit operatively connected between said error value calculating unit and said data processing apparatus, comprising:
  an updating unit, operatively connected to said error value calculating unit, for calculating an updating quantity for said internal-state value storing unit; and
  an updating value calculating unit, operatively connected between said updating unit and said internal-state value storing unit, for calculating internal-state values for said internal-state value storing unit.

* * * * *